(12) United States Patent
Sternberg

(10) Patent No.: US 10,798,892 B2
(45) Date of Patent: Oct. 13, 2020

(54) AERIFICATION SYSTEM

(71) Applicant: Capillary Concrete, LLC, Celebration, FL (US)

(72) Inventor: Martin Sternberg, Gothenburg (SE)

(73) Assignee: CAPILLARY CONCRETE, LLC, Celebration, FL (US)

( * ) Notice: Subject to any disclaimer, the term of this patent is extended or adjusted under 35 U.S.C. 154(b) by 4 days.

(21) Appl. No.: 16/367,879

(22) Filed: Mar. 28, 2019

(65) Prior Publication Data

US 2019/0216027 A1    Jul. 18, 2019

Related U.S. Application Data

(63) Continuation-in-part of application No. 15/281,241, filed on Sep. 30, 2016, now Pat. No. 10,264,741, and a continuation-in-part of application No. 16/233,608, filed on Dec. 27, 2018.

(60) Provisional application No. 62/236,174, filed on Oct. 2, 2015.

(51) Int. Cl.
| | |
|---|---|
| *A01G 29/00* | (2006.01) |
| *A01G 7/00* | (2006.01) |
| *A01C 15/04* | (2006.01) |
| *A01G 25/16* | (2006.01) |
| *A01B 45/02* | (2006.01) |

(52) U.S. Cl.
CPC .............. *A01G 29/00* (2013.01); *A01B 45/02* (2013.01); *A01C 15/04* (2013.01); *A01G 7/00* (2013.01); *A01G 25/167* (2013.01)

(58) Field of Classification Search
CPC ...... A01G 25/16; A01G 25/167; A01G 25/06; A01G 29/00; A01B 45/02

USPC ......................................................... 47/48.5
See application file for complete search history.

(56) References Cited

U.S. PATENT DOCUMENTS

| | | |
|---|---|---|
| 1,906,494 A | 5/1933 | Steward |
| 2,026,052 A | 12/1935 | MacLeod |
| 3,307,360 A | 3/1967 | Bailey |

(Continued)

FOREIGN PATENT DOCUMENTS

| | | |
|---|---|---|
| CN | 1057590 | 1/1992 |
| CN | 107035672 | 8/2017 |

(Continued)

*Primary Examiner* — Monica L Barlow
*Assistant Examiner* — Aaron M Rodziwicz
(74) *Attorney, Agent, or Firm* — Allen, Dyer et al.

(57) ABSTRACT

An aerification system for controlling moisture content and gas exchange below a surface of one or more plant growing areas includes at least first and second sub-systems installed below the surface of the one or more plant growing areas. The first and second sub-systems each having a water permeable layer overlying a respective water impermeable layer, where the water impermeable layer defines a respective boundary of each of the first and second sub-systems. The system also includes at least one conduit connecting the water permeable layer of the first sub-system to the water permeable layer of the second sub-system, and at least one pumping system for pumping water therebetween. The pumping system is configured to alternate between pumping water to the first sub-system and the second sub-system in order to periodically raise and lower a water level in the water permeable layer of each of the first and second sub-systems.

35 Claims, 9 Drawing Sheets

(56) References Cited

U.S. PATENT DOCUMENTS

| | | | |
|---|---|---|---|
| 4,462,184 A | 7/1984 | Cunningham | |
| 4,523,755 A | 6/1985 | Turba | |
| 4,576,511 A * | 3/1986 | Vidal, Jr. | E01C 13/06 405/37 |
| 4,878,780 A * | 11/1989 | Vidal | E01C 13/02 405/38 |
| 5,590,980 A * | 1/1997 | Daniel | A01G 25/06 405/36 |
| 5,938,372 A * | 8/1999 | Lichfield | A01G 25/06 405/36 |
| 5,944,444 A * | 8/1999 | Motz | E01C 13/083 137/561 R |
| 6,095,718 A * | 8/2000 | Bohnhoff | E02B 11/00 405/52 |
| 6,419,422 B1 * | 7/2002 | Wachtel | A01G 25/06 165/45 |
| 7,114,877 B2 | 10/2006 | Wilkerson | |
| 7,638,065 B2 * | 12/2009 | Stever | B01D 21/0012 210/747.3 |
| 7,699,562 B2 | 4/2010 | Clark | |
| 7,866,918 B2 * | 1/2011 | Otto | E01C 13/02 405/302.7 |
| 9,095,763 B2 | 8/2015 | Sternberg | |
| 9,476,166 B2 | 10/2016 | Hydock | |
| 10,264,741 B2 | 4/2019 | Sternberg | |
| 2003/0082004 A1 | 5/2003 | Wilkerson | |
| 2003/0118403 A1 | 6/2003 | Wilkerson | |
| 2004/0005193 A1 * | 1/2004 | Mazzei | A01G 25/06 405/43 |
| 2006/0051161 A1 | 3/2006 | Benson | |
| 2007/0278142 A1 | 12/2007 | Clark | |
| 2008/0098652 A1 | 5/2008 | Weinbel | |
| 2008/0292865 A1 | 11/2008 | Ball et al. | |
| 2010/0093454 A1 | 4/2010 | Ball et al. | |
| 2012/0216457 A1 * | 8/2012 | Robb | A01G 25/06 47/48.5 |
| 2013/0183097 A1 * | 7/2013 | Scantling | A01G 25/06 405/43 |
| 2014/0124418 A1 | 5/2014 | Ishihara | |
| 2016/0073596 A1 * | 3/2016 | Pals | A01G 25/06 405/42 |
| 2016/0295817 A1 * | 10/2016 | Pujadas | A01G 25/06 |
| 2017/0094919 A1 | 4/2017 | Sternberg | |

FOREIGN PATENT DOCUMENTS

| | | | |
|---|---|---|---|
| DE | 102008044395 | 6/2010 | |
| EP | 3355686 | 8/2018 | |
| FR | 2556381 | 6/1985 | |
| GB | 2245132 | 1/1992 | |
| JP | S63117780 | 5/1988 | |
| JP | H05272109 | 10/1993 | |
| JP | H08302800 | 11/1996 | |
| JP | H0995903 | 4/1997 | |
| JP | 2000170113 | 6/2000 | |
| JP | 2001146703 | 5/2001 | |
| JP | 3253231 | 2/2002 | |
| JP | 3253231 B2 * | 2/2002 | |
| JP | 2004107101 | 4/2004 | |
| JP | 2004211368 | 7/2004 | |
| JP | 2005068887 | 3/2005 | |
| JP | 2009538703 | 11/2009 | |
| JP | 2010144439 | 7/2010 | |
| JP | 2002339310 | 11/2012 | |
| WO | WO8500631 | 2/1985 | |
| WO | WO2005026442 | 3/2005 | |
| WO | WO2007070913 | 6/2007 | |
| WO | WO2012036612 | 3/2012 | |
| WO | WO-2012036612 A1 * | 3/2012 | A63B 69/3691 |
| WO | WO2017055575 | 4/2017 | |

* cited by examiner

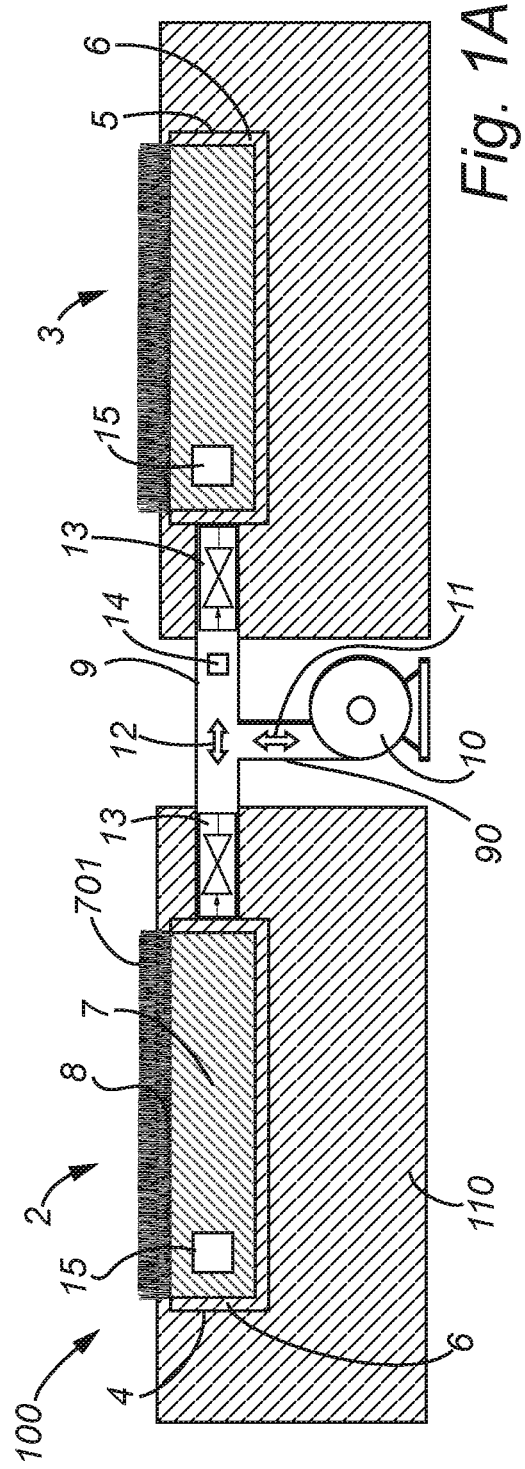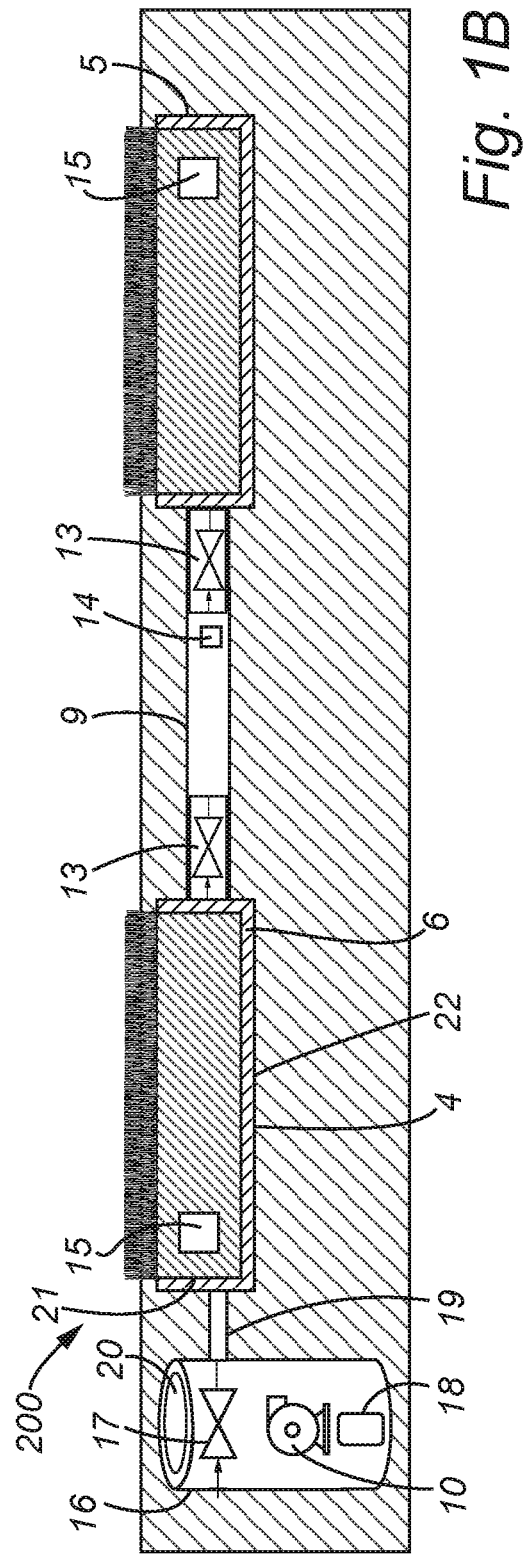

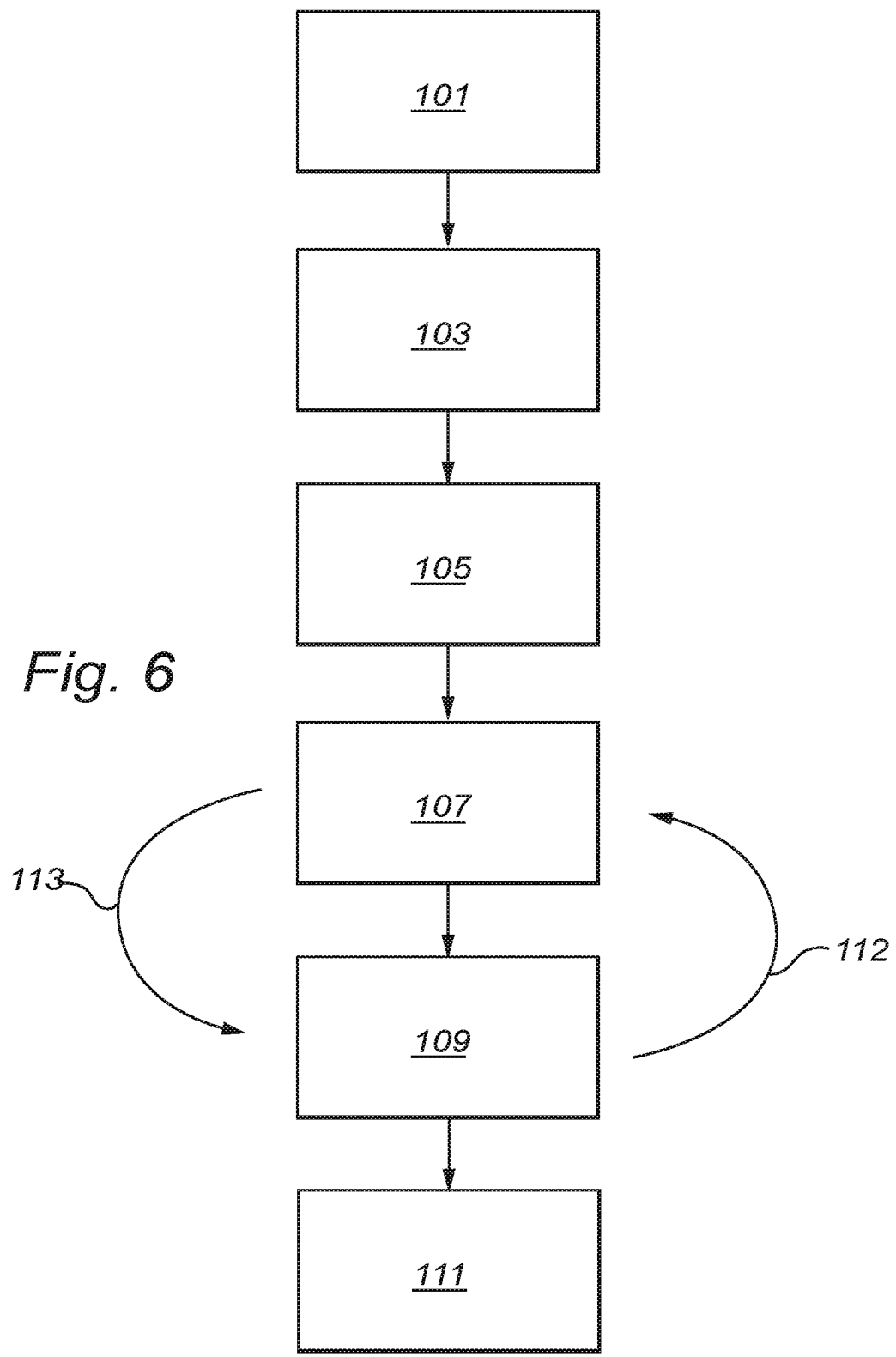

AERIFICATION SYSTEM

RELATED APPLICATIONS

The present invention is a continuation-in-part of U.S. patent application Ser. No. 16/233,608 filed Dec. 27, 2018, and U.S. patent application Ser. No. 15/281,241 filed Sep. 30, 2016, which claims priority to Provisional Patent Application Ser. No. 62/236,174 filed Oct. 2, 2015, the entire contents of these applications are incorporated herein by reference.

TECHNICAL FIELD

The present invention relates to an aerification system for controlling a moisture content and gas exchange below a surface portion of one or more areas to be irrigated and aerified and a method for providing such an aerification system.

BACKGROUND

Systems and methods for efficient water management and optimal plant growth in agriculture and horticulture arrangements have been under constant development. Particularly, with recent increased awareness and efforts on minimizing the environmental impact of such systems even further advancements have been made in minimizing the water consumption per irrigated area or even per plant while maximizing the efficiency of such systems. For instance, irrigation of the plants with careful monitoring and control over the moisture conditions of the growth environment in turn induces optimized plant growth as well as higher success rates in plant cultivation and economic returns.

There are several types of irrigation techniques such as furrow, flood, sprinkler, spray, sub-surface, drip, etc., with each having pros and cons. However, when it comes to maximizing irrigation efficiency, sub-surface systems have been mostly praised due to the fact that plant roots show a tendency in growing in line with the direction of a moisture gradient in the vicinity of the roots. Thus, when the moisture level is kept higher below the roots compared to the surface level, plants grow a deeper rooting network resulting in more stable and durable plants.

A variety of sub-surface systems have been used in the past such as those disclosed in U.S. Pat. No. 5,590,980 and WO 85/00631. However, most of these types of arrangements are complicated and costly to install and do not completely provide a desirable controllable plant growth environment across a large area.

In addition, when irrigating large areas optimally managing the amount of water excess or dearth to the needs of the plants as well as accurate control on the growth environment of the root zone where the plant roots are located and intended to grow can be a pressing challenge.

Therefore, there is a need to further develop systems for accurately controlling the moisture level of large areas with planted surfaces and provide desirable growth conditions for strong root networks, further advancing the optimum plant growth environment while reducing the water usage and operation costs.

SUMMARY

It is accordingly an object of the present invention to improve the current state of the art and to mitigate at least some of the above mentioned shortcomings.

These and other objects are achieved by providing an aerification system and a method for providing an aerification system as defined in the appended claims.

It is to be understood that in the context of the present application, the term exemplary is to be interpreted as serving as an example, instance or illustration.

According to a first aspect of the present invention, there is provided an aerification system for controlling a moisture content and/or gas exchange below a surface portion of one or more areas to be irrigated, the system comprising at least first and second aerification sub-systems being in fluidic communication with the one or more areas, and being installable in a recess above which the surface portion is located; at least one conduit arranged to fluidically connect the first sub-system to the second sub-system; and at least one pumping system for pumping a fluid back and forth between the first sub-system and the second sub-system wherein the fluid from the first sub-system is at least partly transferable by the pumping system via the at least one conduit to the second sub-system and wherein the fluid from the second sub-system is at least partly transferable by the pumping system via the at least one conduit to the first sub-system and wherein the pumping system is further configured to periodically raise and lower a height level of the fluid between a predetermined minimum height level value and a predetermined maximum height level value in the first and second sub-systems enabling a gas exchange below the surface portion.

The invention is based on the realization that by providing a network of aerification sub-systems for sub-surface irrigation and aerification of a plurality of large areas with large planted surfaces such as turf grass, golf-green, tennis court, teeing ground, lawn, sports arenas, arenas with mix of turf grass and artificial grass, etc., an unforeseeably efficient, uniform irrigation and a surprisingly improved plant growth environment with continuous oxygenation of the root zone can be achieved. By connecting at least two aerification sub-systems via a conduit such that fluid can be transported between the two connected sub-systems by, e.g., a pumping system, the fluid can be pumped back and forth between the connected sub-systems. Thus, by periodically raising and lowering the fluid level in the sub-systems in predetermined intervals a gas exchange zone can be created in the root zone leading to optimal irrigation and oxygenation of the root zone.

Even though in the following the invention will be described vastly with reference to water as the fluid, it is obvious to the skilled person in the art that the fluid could be any other suitable fluid, liquid, air, gas, etc. aimed at promoting the plant growth and plant growth environment control.

It has been found by the inventor that such a connection between at least two large areas to be irrigated and aerified efficiently decreases the collective amount of water required for delivering the optimal moisture level to the network of connected sub-systems. This way over-irrigation or soaking of plants in one sub-system with excessive moisture level is avoided while the available excess water can be directed to other sub-systems in need of irrigation. Moreover, the water level in each sub-system can be kept at a desired level by transferring the excess amount of water to another area without discarding the transferred amount. Thus, overall demand of water in the connected system is significantly minimized.

In the context of the present application a sub-system is to be broadly interpreted and generally refers to at least one portion of an area having the components to be able to function in a connected network of such sub-systems. By components in the context of this application it is to be understood equipment or structural elements needed for functionality of a sub-system including constructing materials such as layers of sand, soil, turf, planted surfaces, fluid permeable and fluid impermeable layers, layers of rooting medium, any form of aggregate material, crushed stone, gravel, layers with porous properties, e.g., a mixture of cement and particulate stone such as Capillary Concrete™ which is commercially available from the applicant.

Other components included in or separately provided for each sub-system may include pumping systems, pipes, conduits, valves, fluid connectors installed between sub-systems within the same area or sub-systems in other parts of the system, sensing systems, pressure and thermal control devices, fluid inlets and outlets, fluid injection lines, fertilizer or gas injection devices, etc. In other words, one sub-system may comprise a variety of combinations of the components according to the intended use.

For instance, a plurality of sub-systems in the network may only comprise some of the components such as layers of different construction materials. Whereas other sub-systems may comprise additional components such as sensing devices, pumping systems, gas injection nozzles, etc., and whereas other sub-systems may comprise a full component level including all available equipment for the aerification system. In either case, all the sub-systems connected in an aerification system are capable of receiving and transferring water, fertilizer fluids, different types of gas exchanges such as oxygen and carbon dioxide in the connected network and the root zone. Additionally or alternatively, all connected sub-systems may comprise the same configuration of components.

Each sub-system therefore is a functional unit intended to provide suitable moisture levels and gas exchange to the plant growth environment, which is the environment in the root zone of the irrigated areas. As mentioned above each area to be irrigated and aerified may comprise at least one aerification sub-system.

In the context of the present invention, a recess is to be understood as an opening or excavated hole in the ground, or any other equivalent plant growth bases examples of which includes casts of various shapes and geometries built above the surface level of the ground. This may include above ground planters, raised garden beds, etc. Furthermore, the references made to a recess or hole in the areas is intended to be a descriptive term of the appearance of the area before the sub-system(s) is installed in the recess, and after installation the recess or hole will no longer be visible.

"Back and forth" in the context of present invention is to be interpreted broadly and should be understood the transfer or moving of fluid to and from the sub-systems such as in one direction and then in the opposite direction from the first sub-system to the second sub-system. It should also be understood as moving the fluid in upstream and downstream directions between the first sub-system and the second sub-system.

The term "raising" a height level of a fluid is meant to be understood as to increase the amount and elevate the height of a fluid from a base or lower vertical level to a higher vertical level. By "lowering" a height level of a fluid it is meant to be understood as to decrease the amount and move down or lower the height of a fluid from a higher vertical level to a lower or base vertical level.

By "periodically" in the context of the present invention it is meant raising and lowering a level of water in the sub-systems at regularly occurring intervals over a certain period of time. The action of periodically changing the water level thus may occur in certain time intervals with predetermined time period for the intervals. The action of periodically changing the water level may be continuous. The time intervals of raising and lowering the water level may have similar predetermined time periods or may vary. For instance, the water rising cycles may be arranged to take longer than the water lowering cycles or vice versa. The act of periodically raising and lowering the water level may also refer to instances in which changing the water level is performed in a non-continuous manner, e.g., with time breaks between each series of intervals of raising and lowering the water level. By "gas exchange" below the surface portion it is meant delivery of oxygen to and removal of carbon dioxide from the root zone located below the surface.

According to the invention, a conduit is intended to refer to a connecting element which is capable of fluidically connect two sub-systems or areas. The conduit may be of various designs, shapes, geometries and sizes. The conduit may be a pipe connecting the sub-systems or simply a channel, ditch, or trough excavated between the two areas and extended from one sub-system to another sub-system. The conduits may be made of the same materials and layers of the sub-systems. The conduit may also have a different constructional structure than the sub-systems. The conduit may also comprise a fluid basin with fluid inlets and outlets connecting the sub-systems and allowing the fluid to be pumped in and out of the sub-systems.

It has been found by the inventor that by periodically transferring water back and forth between the sub-systems that a considerably efficient, versatile and straightforward irrigation and aerification scheme can be achieved for controlling the moisture level of rooting plants such as turf grass with up to 85% reduction in water consumption while accurately controlling the moisture of the root growth environment. Accordingly, by pumping water in and out of the sub-systems, the water level in each sub-system can be raised and lowered in various intervals which creates an optimum moisture level and adequate oxygenation of the roots promoting a continuous gas exchange.

According to the invention, one additional advantage of connecting multiple large areas is that rain water or any excess water in the aerification system can be transported out of each sub-system but does not have to be directly discarded or stored in a reservoir or container but rather distributed among the areas in need. Although in different examples the system may comprise storage units or storage spaces to temporarily or permanently store water, fertilized water or any other fluid required to be introduced in the aerification system may be provided on demand.

In a different example, each area can be divided into two or more equally large sections by a divider with a liner in the tee area and water may be pumped back and forth between the sections. Each section may individually comprise its own sub-system or one or more sub-systems may be shared among the sections or optionally multiple sub-systems may be installed in each section.

According to the invention, one further advantage achieved is to enable the aerification system for hydroponic growth of plants such as turf grass or golf green in areas with a large surface. By a hydroponic plant growth system, it is intended to include the systems and methods which use a water-based, nutrient rich solution delivered to the roots of the plants. Accordingly, by the inventive system of the present invention it is possible to deliver fertilized water to the roots of the golf green while controlling the levels of nutrients, oxygen, temperature and other growth factors in the root zone.

Additionally, the uniform distribution of moisture to the root zone lowers the demand to use abundant amounts of fertilizers compared to surface-irrigation systems where it is hard to distribute the same amounts of nutrients evenly over the whole area. Highly controlled environments for growing plants such as turf grass notably increases the wear-tolerance, overall health of plants, drought resistance and pest resistance.

Additionally, the environmental footprint of the system significantly decreases by reducing the amount of water consumption and reducing soil erosion and degradation. Further, by using the inventive system of the present disclosure drainage of fertilizer/nutrient or pesticides to the environment is significantly reduced, contributing further to reducing the environmental impact and overall maintenance costs.

In one example the pumping system may further be configured to raise and lower the height level of the fluid between the predetermined minimum height level value and the predetermined maximum height level value in the first and second sub-systems in predetermined time intervals.

In yet another example when the height level of the fluid would be raised in the first sub-system, the height level of the fluid may be lowered in the second sub-system. Additionally or alternatively, when the height level of the fluid may be raised in the second sub-system, the height level of the fluid may be lowered in the first sub-system. This way the system provides the advantage of synchronizing the change in water level in the first and the second sub-systems accordingly and enable transferring water between the sub-systems in cycles.

In accordance with an exemplary embodiment of the present invention, the system may further comprise one or more sensing devices configured to measure a plurality of parameters of the fluid.

According to the invention, a plurality of sensing devices may be implemented in the aerification system for acquiring detectable properties of the aerification system. Such properties may be water or nutrition levels in each sub-system, moisture levels in the root zone, moisture levels in the planted surfaces, oxygen or carbon dioxide levels, as well as levels of fertilizers in the water or the root zone, levels of contaminants in the root zone, etc. By taking advantage of various sensing input the aerification system may modify the irrigation of different sub-systems and areas. For example, if the water level sensor detects that the water level in one sub-system is higher than a permitted or preset value, the aerification system may pump at least part of the water out of that sub-system to another sub-system in need of water or to a temporary water storage to be reintroduced in the irrigation network at a later time. This way the moisture level in the rooting layer of the area can be effectively and optimally adjusted while promoting the plant health. In another example, the one or more sensing devices may be further configured to measure a plurality of parameters of the sub-systems. This way information from the sub-systems and the areas being irrigated may be constantly collected. Such information may comprise moisture levels in different parts or layers of the sub-systems, moisture levels in the planted surfaces, oxygen or moisture levels in the vicinity of the plant roots, or any other information of the chemistry of the rooting zone.

In yet another exemplary embodiment, the system may further comprise one or more controllable valves arranged to control a flow of the fluid in the system.

The flow of water can easily be managed and controlled based on the requirements of different irrigation plans for a connected network of sub-systems. The valves can be manually or automatically controlled to deliver a desirable amount of water within an area or between several areas under irrigation. This can, for example, be advantageous on tailoring the flow rate of the water being pumped from one sub-system to another sub-system or to direct water accordingly in the network by opening and closing of respective valves among the connected sub-systems and water storage spaces or any fluid storage such as fertilized or oxygenated water storage required to be introduced to the irrigation network.

In one example, the at least one pumping system may be arranged in the at least one conduit.

Advantage is taken from the fact that by arranging the pumping system in the conduit, a high degree of control can be achieved on the transfer of water among the sub-systems. This enables even further modularity in the system by installing pump-implemented conduits in any part of the already existing aerification systems in retrofit or readily expanding the network with increasing the number of connectable sub-systems.

In another exemplary embodiment one or more sensing devices may be arranged in the at least one conduit and configured to measure the plurality of parameters of the fluid.

By locating a plurality of sensing devices in the conduits a variety of parameters of the fluid being transferred between the sub-systems can be measured. PH levels, oxygen or carbon dioxide levels, fertilizer levels, water temperatures, hardness of water or similar parameters are amongst the detectable properties which can provide useful information to an operator of the aerification system or to a controlling computer to adjust levels of such parameters in the water. As it should be appreciated, locating the sensing devices in the conduits also facilitates the maintenance of the system in case there would be a need to replace or further equip the system with additional sensing devices, the conduits may be separated from the system easily without any interference in the rest of the irrigation set up. Moreover, a constant control over the properties of the transferred water can be achieved by measuring those parameters right after the water exits one sub-system and before it enters the other sub-system. This way if the PH parameter, water temperature, or fertilizer or oxygen levels in the water deviate from allowed values, for example, they can be adjusted before water is distributed to the other areas.

In a further embodiment, the one or more controllable valves may be arranged in the at least one conduit and be configured to control a flow of the fluid along the at least one conduit.

According to the invention, an advantage of arranging the controllable valves in the conduit is that a customizable flow network among a plurality of connected sub-systems can be achieved by synchronized control of valves. A plurality of inlet or outlet valves may be arranged in each conduit enabling control over entrance, exit and time of residence of water in each sub-system. For instance, if an area is in immediate need of irrigation, by fully opening the inlet valves of the connecting conduit and fully closing the outlet valves of the water outlet from that sub-system, the moisture level or the level of water in the area can be elevated in a relatively short time. After the desired amount of moisture level is detected by the sensing devices in the irrigated sub-system, for example, the controllable valves can be reversed and the water is redirected to other sub-systems.

The controllable valves may further be used to control the flow rate of water from one sub-system to another sub-system under a specific watering plan, for example, and the sub-systems may be arranged to be irrigated at a certain rate and under a certain time period. By accurately controlling the outlet of each valve, the flow of water can be controlled in each sub-system, and intervals of decrease and increase in the water level of each area executed.

In a different example, the conduits may be connected to a water storage used for long-term or temporary storage of water or equivalent fluids such as liquid fertilizers or fertilized water. By controlling the valves, the required amount of water or fertilizer can be introduced into the aerification system. The rate of introducing such resources may be set according to predetermined values in a maintenance plan, or may be adjusted based on the information received from the sensing devices.

In yet another example, the connected areas may be arranged to be irrigated periodically over a time span, followed a period of no irrigation controlled by the valves. The irrigation and no irrigation periods may be scheduled due to the environmental or seasonal demands. For example, in the rainy season the aerification system may be scheduled for operating an irrigation plan for intervals of two times per week, with each irrigation interval lasting for 6-12 hours, followed by a period of no irrigation until the next irrigation interval. Under such conditions, the valves for each conduit may be fully opened, fully closed, or partially opened.

At low temperatures, the grass plant will go into hibernation and the air humidity determines the amount of water the plant uses to transpire. In a dry season due to the drop in atmospheric precipitation, changes in air humidity and temperature causes the amount of water in the root zone to be affected and the system may be arranged to perform an irrigation plan daily, and in shorter intervals. For instance, the valves may be kept in the partially open or fully open state more frequently, e.g., every 3-6 hours per day followed by a short no irrigation break (closed state). In another further example, the valves may be arranged to be partially open at a certain outlet volume to constantly transfer water among the sub-systems. The water may be pumped back and forth at a decided flow rate over extended irrigation periods. One advantage is that by adjusting the valves at a certain outlet volume one can continuously achieve consistent moisture levels in each sub-system and thus the areas can be uniformly and gradually irrigated.

Another advantage of arranging the valves in the conduits is that it improves the fault detection and maintenance of the aerification system as each conduit can be easily disconnected from the system and the valves can be repaired or replaced. The conduits with installed valves also further contribute to increased modularity of the system.

In accordance with yet another exemplary embodiment each sub-system may include a substantially fluid impermeable first layer for preventing fluid from escaping a volume defined by the recess, and a substantially fluid permeable second layer arranged on top the first layer.

The inventor has realized that if the recess or excavated hole in the ground, into which the sub-systems are being installed, is lined with a first layer or membrane which is water/fluid impermeable such as plastic, onto which a second water/fluid permeable layer is subsequently poured or positioned, then not only can proper isolation from the surrounding soil be achieved, but also water originating from natural occurrences (e.g., rain, or snow) may be collected and utilized in a more efficient manner by circulating it in the connected network among the sub-systems. For example, if the moisture level of an area or sub-system would be determined to be higher than a desired level in reference to a predetermined value after some rain or snow, then the water would be kept within the water impermeable lining. This would cause the water level in the sub-system to rise increasing the detected moisture level in the second water permeable layer which consequently controls the moisture level in the root zone. The root zone may be arranged in the same second water permeable layer or additionally or alternatively in another rooting, turf or sand layer placed directly on top of and in fluidic contact with the water permeable second layer.

The detected excess water level may trigger the pumping system to remove the water, at least partly from this sub-system to another sub-system in order to lower the moisture level of the second layer to a desired level.

Further, it is to be understood that the lining with a water impermeable material does not only involve lining the bottom surface of the recess, but also may involve lining the walls of the intended volume into which the aerification sub-systems are arranged, e.g., the walls of the recess. Thereby this prevents fluid or water from escaping through the side walls as well as the first layer will not prevent water to escape upwards, e.g. due to evaporation, however, technicalities like these are assumed to be obvious for the skilled artisan.

In yet another example, at least one portion of the second layer is in fluidic communication with the at least one conduit.

In each sub-system, arranging the second layer to be at least partly in fluidic communication with the conduits enables the direct transfer of water from one sub-system to the water permeable layer of the other sub-system without the need for any additional components for the rapid adjustment of the moisture level in each sub-system. It is readily conceivable that the entire second layer of each sub-system can be in direct contact with water or in fluidic communication with the conduits. This may be by aid of installed irrigation pipes in the second layer or merely by pumping water directly into the second layer. Further, the second layer may also be indirectly in contact or in fluidic communication with each conduit.

When the system is arranged such that at least one portion of the second layer is in direct contact with water, an increased water level would cover more of the second layer in water. This effectively increases the moisture level in the second layer and subsequently also in the root zone or in another rooting medium arranged on top of the second layer. Even though no perforated pipes or tubes are needed in order to achieve the desired effect of irrigating a large surface area, the aerification system of the present invention may comprise at least one perforated pipe or flat drainage material within or directly below the second layer (but above the water-impermeable layer), in order to speed up the irrigation/aerification of the root zone or another above-lying particle size fraction (e.g. soil or sand). The perforated pipe may be a single pipe or flat drainage material placed within or below the second layer, or it may be a grid of perforated pipes placed within or below the second layer.

In a further example, each sub-system may further comprise a fluid control basin comprising means for controlling a moisture level of the second layer.

The inventor has realized that a fluid/water control basin such as a well or a container, for example, can be installed in each sub-system in direct contact or in fluidic communication with the second layer. Accordingly, controlling the water content of the water control basin enables control over the moisture level of the sub-system or irrigated area. In other words, by either adding or removing water from the water control basin, the water level in the basin and consequently the water level in the second layer can be controlled.

Additionally or alternatively, the fluid basin may be equipped by further components such as pumping devices, sensing devices, valves, etc. At least one pumping system may be arranged in the fluid control basin and would be configured to pump the fluid/water in and out of the fluid control basin. Further, the fluid control basin may comprise an injection device configured to inject gases or chemical substances in the fluid control basin. This injection device may be a simple air pump used to inject air or oxygen into the water control basin. The injection device may also add fertilizers or various growth promotor fluids to the water control basin. The level of oxygen, fertilizers, etc., in the water control basin may be detected by one or more sensing devices arranged in the fluid control basin configured to measure a plurality of parameters of the fluid in the fluid control basin. The plurality of parameters may be at least one of temperature, PH, fertilizer levels and oxygen levels of the fluid.

The sensor devices may also be arranged to measure the water level in the water control basin. In some examples at least one portion of the second layer would be arranged to be in direct fluidic contact with the water control basin, and the water level sensing devices in the water control basin would detect the corresponding water level in the second layer by detecting the water level in the water control basin. Additionally or alternatively, the one or more sensing devices may be directly arranged in the second layer of the sub-system and detect the fluid parameters and the water level directly in the second layer. Optionally, the sensing devices may also be arranged in the root zone or planted surface to detect the moisture level of the root zone or root oxygenation in the vicinity of the planted roots.

In a different example, the water control basin may be in direct contact or fluidic communication with a conduit or another water basin from another sub-system. Water can be transferred directly by the pumping system from the second layer of one sub-system to the water basin of another sub-system. Additionally or alternatively, water may be transferred from the water basin of one sub-system to the water basin of another sub-system.

In an example, the water control basin may be located at a peripheral edge of the recess and adjacent to a side-wall of the recess with the side-wall being covered with the water-impermeable first layer. By having the water control basin located near the periphery of the intended irrigation area, the maintenance of the water control basin may be facilitated with minimal interference with the (planted) surface area(s).

For example, if the intended irrigation area is a golf green or teeing ground, an operator can repair and check the water control basin and associated parts without ever stepping out on the golf green or teeing ground. Moreover, placement of the water control basin at a peripheral edge is also aesthetically beneficial as the planted surface may be provided without any unnatural parts, in contrast to if a sprinkler system was used and one was forced to install sprinkler nozzles at various locations all over the surface area. Further, this facilitates the arrangement where two sub-systems may be directly connected via their respective water control basins. This can be advantageous in scenarios when the installation budget is limited or the area(s) to be irrigated is relatively small and there is no need for additional conduits to be added to the network.

Alternatively, or in addition to removing water by means of the pumping device, the water basin may be provided with exit hole(s) or exit pipe(s) arranged at a suitable position within the water control basin. For example, one or more exit holes/pipes may be arranged at a predetermined height whereby a predetermined maximum water level may be maintained. Thus, when the water level exceeds the predetermined maximum the water will simply exit from the water control basin through the exit hole(s)/exit pipe(s). The exit hole(s)/pipe(s) may be configured to be remotely controllable by arranging a motor in mechanical engagement with a control arm which determines the position of an exit pipe, for example.

The exit hole(s) or exit pipe(s) can, for example, function as a protection mechanism against flooding. The exit hole(s)/exit pipe(s) may be equipped with controllable valves for controlling the amount of water exiting the water basin. The exit hole(s)/exit pipe(s) may be connected to the water basin of another sub-system, to a water storage space, directly to a second layer of another sub-system or simply to another conduit for water transportation.

In a further example, the water control basin of the sub-systems may comprise a filtering component such as a bio-filter system. The filtering system preserves the rooting area and specifically plant roots by capturing and reducing the level of harmful chemicals, other organic water pollutants or microbial pathogens in the aerification system. In addition, the filter introduces beneficial bacteria, fungus and microorganisms that benefit the grass plants in various ways. For instance, the *Trichoderma* is a fungus family of beneficial fungus that grow in symbiosis with the plants and reduce various pests, and this fungus can be part of the filter.

In yet another example at least one portion of the second layer may be in fluidic communication with the fluid in the fluid control basin.

As explained above, the fluid in the second layer may partially or entirely be in contact with the fluid in the water control basin. When the system is arranged such that a part of the second layer may always be immersed in water or in fluid communication with water in the water control basin, spreading water in the second layer can be achieved in a cost-effective and simple manner by taking advantage of the pumping system or facilitated water movement in the second water permeable layer. Further, capillary forces may be used to distribute water in the second layer. By keeping a portion of the second layer continuously in fluid communication with water or direct contact (immersed in water), the water may be spread in the second layer or towards another layer, e.g., a soil/sand layer placed on top of the second layer together with the associated plant roots, thus reducing the need of excessive piping with perforated or aperture tubes as the transport of water is done by the second layer itself.

Fluid communication in this context can be understood as that the water control basin is spaced apart from the second layer but that there is a pipe or conduit connecting the water control basin and a portion of the second layer so that fluid is free to flow between this portion of the second layer and the water control basin. Meaning that the water control basin may be located outside the volume defined by the water-impermeable layer but still able to deliver fluid to the second layer. The water control basin may also be located in another connected sub-system.

In a further example, each sub-system may include a substantially fluid impermeable first layer for preventing fluid from escaping a volume defined by the recess, a porous second layer arranged on top of the first layer, and a third layer of rooting medium arranged on top of the second layer, such that a fluid from the porous second layer is enabled to be transported towards the third layer of rooting medium by means of capillary forces.

The present invention is partly based on the realization that positioning a uniformly spread layer of a porous material beneath a field area, such as, e.g., a grass turf, golf-green, teeing ground, lawn, sports arena, etc., and utilizing capillary forces, could provide an efficient and simple aerification system. The porous material may for example be Capillary Concrete™, which is described in the PCT-application WO 2012/036612 by the same applicant, incorporated herein by reference.

In a further exemplary embodiment, each sub-system may be in fluidic communication with a fluid storage space.

This can be particularly advantageous to temporarily store excess or backup fluid/water, fertilized water, highly oxygenated water, pesticide fluids, etc. and introduce these resources to the system as the needs arise. This could also be advantageous in cases where sub-systems may have reached an upper threshold moisture level limit and thus there would be a requirement to deplete the system, at least temporarily, from water in order to avoid flooding or excess moisture levels in the rooting medium. Further, this could be advantageous in cases of heavy precipitation such as in a rainy season to collect and accumulate excess rain water in the temporary water storage system. In a different example, the water storage source may be a natural or artificial pond or lake or similar located in the proximity of intended irrigation area, e.g., in a golf green or teeing ground.

In another exemplary embodiment of the present invention, the aerification system may further comprise a controller configured to control the at least one pumping system for transferring the fluid back and forth between the first and the second sub-systems. In a different example the controller may be configured to control the one or more sensing devices for continuously or periodically measuring the plurality of parameters of the fluid or the rooting medium.

In yet another example, the controller may be configured to control the one or more controllable valves for adjusting the flow of the fluid between the first and the second sub-systems. The controller may trigger the pumping system or the controllable valves based on the output of the sensing devices. The controller may be configured to control the at least one pumping system based on a comparison of the measurements of the sensing devices with a predetermined value for each of the plurality of parameters.

For instance, if the water level would be detected as higher than a predetermined level in the first sub-system by the water level sensor, the controller may trigger the pumping system in the first sub-system to pump water at least partly out of the first sub-system and transfer it to the second sub-system or to a water storage space. The controller may also trigger inlet or outlet valves to be at least partially opened or closed to control the flow of the water being pumped among the sub-systems based on the water level sensor output. The controller may also control and adjust the levels of nutrient/chemical/fertilizer or oxygen in the water by activating or deactivating the injection device based on the measurements of such parameters by the sensing devices.

In a different example the controller may activate a heater/cooler installed in the water control basin or at least one of the conduits to increase or decrease the water temperature flowing among the sub-systems. The controller may also be activated upon a user command by manually entering an activation or deactivation signal via user interfaces. The controller may also be configured to automatically perform the task of controlling the aerification system without the need of user intervention or involvement.

The controller may be realized as a software controlled processor. However, the controller may alternatively be realized wholly or partly in hardware. The controller preferably has a memory arranged or integrated with the controller to store and execute maintenance plans.

In a different example, the controller may be further configured to control the at least one pumping system based on a data stream received from a weather forecast center. This way the controller would be programmed to adjust the irrigation requirements of the one or more areas well in advance based on atmospheric precipitating levels.

For instance, upon receipt of a heavy rain forecast the controller may adjust the water level in the sub-systems to a lower a level than the ordinary requirements so as to avoid a possible over-irrigation situation under the rainfall conditions. The conditions may also relate to a freeze or dry forecast in such case the controller may adjust the aerification system to temporarily remove a substantial part of the water from sub-systems to prevent the water from freezing in the pipes or water control basin, etc., or schedule a temperature increase for the circulating water among the sub-systems. Under a low rain period forecast the irrigation parameters may be adjusted compared to the regular parameters so as to introduce a higher level of moisture level to the areas.

According to yet another embodiment of the present invention, a bottom portion of the first sub-system may be located at a vertically higher level than a bottom portion of the second sub-system such that the fluid is transferable, at least partly, from the first sub-system to the second sub-system by means of gravity.

By this arrangement yet another degree of freedom is introduced to the system in transferring water between the sub-systems. By constructing the areas intended for irrigation or the sub-systems in those areas with a height difference relative each other, for example, a first sub-system with a height elevation in relation to the second sub-system, water from the bottom portion of the first sub-system would be transferred to the second sub-system via a conduit, or a water control basin by means of gravity. This way simply adding water in the first sub-system and controlling the flow of water via controllable valves lifts the mandate of active pumping of water between the sub-systems.

Clearly, installing a pump would be possible if the water is to be returned to the first sub-system from the second sub-system. However, the gravity driven flow can be advantageous in case a plurality of areas or sections of a single area are constructed with height elevations relative to each other and are to be irrigated sequentially. In this example water may be collected from the last sub-system in the network of connected sub-systems and reintroduced to the first sub-system to establish a continuous water circulation among the sub-systems.

According to a another, aspect of the present invention, there is provided a method for providing an aerification system for controlling a moisture content below a surface portion of one or more areas to be irrigated, where said method includes providing at least first and second aerification sub-systems in fluidic communication with the one or more areas, and being installable in a recess above which the surface portion is located, providing at least one conduit arranged to fluidically connect the first sub-system to the second sub-system, providing at least one pumping system for pumping a fluid back and forth between the first sub-system and the second sub-system, transferring at least partly the fluid from the first sub-system by the pumping system via the at least one conduit to the second sub-system, transferring at least partly the fluid from said second sub-system by said pumping system via the at least one conduit to the first sub-system, and raising and lowering a height level of the fluid between a predetermined minimum height level value and a predetermined maximum height level value in the first and second sub-systems and enabling a gas exchange below the surface portion.

It should be noted that the steps of the method explained above may be performed in any logical order, e.g., by providing the pumping system prior to providing the at least one conduit or the like.

In one example the method may further comprise raising and lowering the height level of the fluid between the predetermined minimum height level value and the predetermined maximum height level value in the first and second sub-systems in predetermined time intervals.

In accordance with yet another exemplary embodiment of the present invention, the method may further comprise, when raising the height level of the fluid in the first sub-system, lowering the height level of the fluid in the second sub-system.

In accordance with a further exemplary embodiment of the present invention, the method may further comprise, when raising the height level of the fluid in the second sub-system, lowering the height level of the fluid in the first sub-system.

In one further example the method may further comprise transferring, at least partly, the fluid from the first sub-system to the second sub-system by adding the fluid to a second layer of the second sub-system.

In another example the method may further comprise transferring at least partly, the fluid from the first sub-system to the second sub-system by adding the fluid to a fluid control basin of the second sub-system.

With this aspect of the invention preferred features and advantages of the invention are readily available as in the previously discussed aspect of the invention, and vice versa.

These and other features of the present invention will in the following be further clarified with reference to the embodiments described hereinafter.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein:

FIGS. 1A-1C show a schematic overview of an aerification system in accordance with at least one embodiment of the present invention;

FIG. 6 shows a flow chart for providing an aerification system in accordance with yet another embodiment of the present invention;

As illustrated in the figures, some features such as the sub-systems, conduits, and water control basin are not to scale and are merely provided to illustrate the general structures of embodiments of the present invention. Like reference numerals refer to like elements throughout.

DETAILED DESCRIPTION

Figure 1C:
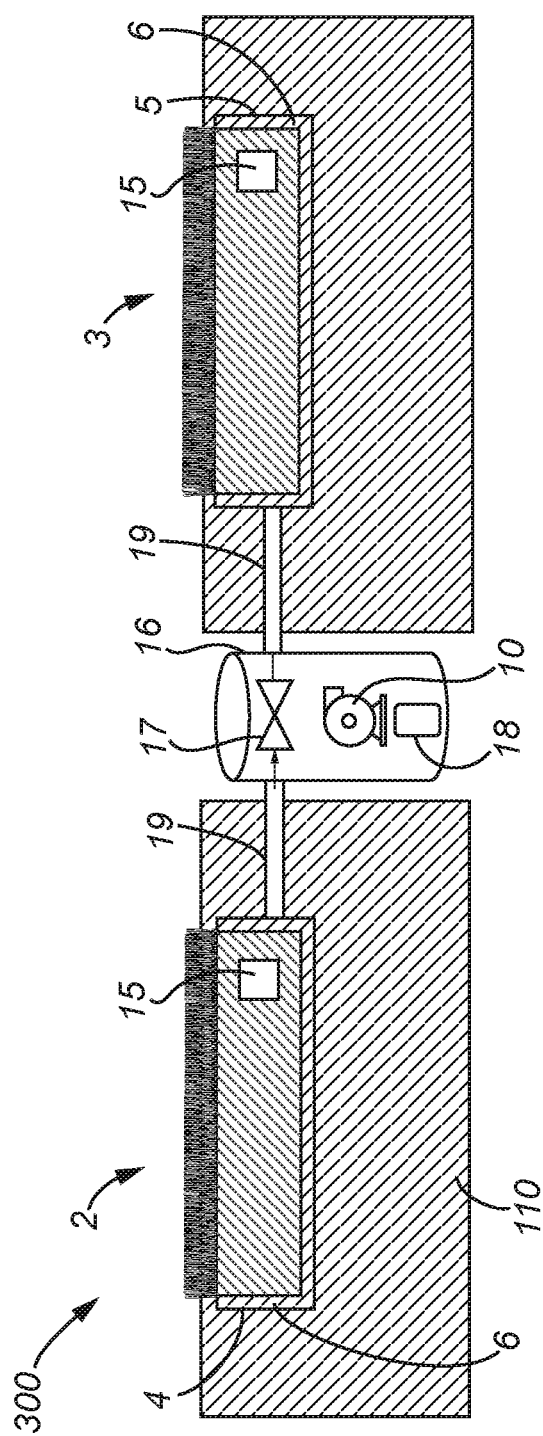

In the present detailed description, aspects of the present invention will be discussed with the accompanying figures. It should be noted that this by no means limits the scope of the invention, which is also applicable in other circumstances for instance with other types or variants of methods for providing aerification systems or other types or variants of the aerification systems than the embodiments shown in the appended drawings. Further, that specific features are mentioned in connection to an embodiment of the invention does not mean that those components cannot be used to an advantage together with other embodiments of the invention.

The following description will use terms such as "top", "bottom", "inner", "outer", "side", etc. These terms generally refer to the views and orientations as shown in the drawings. The terms are used for the reader's convenience only and shall not be limiting.

FIG. 1A illustrates one example of an aerification system 100 (which may be referred to as system or the system), comprising areas to be irrigated and aerified 2, 3 and a first 4 and a second 5 aerification sub-system (which may be referred to as sub-system or sub-systems) installed in a recess or excavated hole in the areas 2, 3. The areas 2,3 may be a large planted surface such as a lawn or a golf green or a tennis court etc. The sub-systems 4, 5 are installed in a compacted subgrade 110. Each sub-system further comprises a substantially water impermeable layer 6 such as a plastic sheet, rubber sheet, or any equivalent material or membrane installed on the subgrade 110 preventing water from exiting the excavated hole. The areas 2, 3 may be installed in the same subgrade 110 or in different subgrades 110 set apart from each other by a portion of land, lake, etc.

Each sub-system further comprises a substantially water permeable layer 7 provided on top of the water impermeable layer 6. In this example the water permeable layer 7 is also the rooting medium where roots of vegetation or plants 700 such as grass can be planted. The roots of the plants thus would be located below the surface portion 8 of the areas 2, 3 and grow downwardly towards the water impermeable layer 6. The system 100 further comprises at least one conduit 9 arranged to fluidically connect the sub-systems 4, 5. The conduit 9 could be a pipe, tube, channel, or an excavated trough extended between the sub-systems 4, 5. The conduit 9 may be made of flexible or non-flexible materials.

The conduit 9 may be made of plastics such as polypropylene, polyvinyl chloride (PVC), chlorinated polyvinyl chloride (CPVC), high-density polyethylene (HDPE), PEX, any suitable resin such as acrylonitrile-butadiene-styrene (ABS), polybutylene, for example, or metal such as galvanized steel, rigid copper, flexible copper, cast iron, etc. The conduit 9 has preferably high chemical resistance and is durable against rotting, rust build-up, corrosion and collection of waste. The conduit 9 is suitable to handle cold and warm fluids within the standard operating temperature ranges of the conduits. The conduit 9 may also be provided with insulation layers (not shown) to help prevent freezing in the events of atmospheric temperature drop. The system 100 further comprises a pumping system 10 which is configured to pump water between the sub-systems 4, 5. The pumping system 10 may be any known suitable pumping system such as centrifugal pumping systems, air lift pumps, vacuum pumps, etc. to transfer water between the sub-systems 4, 5.

In this example, the pumping system 10 is arranged at the proximity of conduit 9, pumping water in and out of the conduit 9 in direction shown by 11 and in and out of the sub-systems 4, 5 in direction shown by arrow 12. The pumping system 10 may be installed in the same recess in the subgrade 110 as the areas 2, 3 or in a separate recess or depression in the compact subgrade 10 or optionally in a remote area not in direct vicinity of the sub-systems or conduits.

In this example, the pumping system 10 may optionally be installed remotely from the conduit 9 and be coupled to conduit 9 by means of other conduits or pipe connections 90. The system 100 further comprises at least one valve 13, which may be arranged in the conduits or in the sub-systems depending on the applications. In this example two, two-way valves 13 are arranged in the conduit controlling the water inlet and outlet into and out of the sub-systems 4, 5. The valves 13 can be periodically opened and closed. Additionally or alternatively, the valves 13 can be kept at either open or close states for predetermined periods of time or an extended periods of time to completely drain the sub-systems or soak/flood either or both sub-systems 4, 5 for a certain period of time. The valves 13 could be controlled manually by a user of the system 100 or be fully or partially controlled automatically by a controller or a computer system.

The valves 13 may be optionally deactivated/bypassed in the fluidic system in circumstances such as system test or reparation. Number and types of valves included in the system depends on the intended use and may vary accordingly. The sub-systems 4, 5 can be fully operational without the requirement to install controllable valves. The plurality of valves 13, may operate in synchrony with the pumping system 10 and other valves in the sub-systems 4, 5 or other valves and pumping systems installed in other compartments (not shown) of the system 100.

Additionally or alternatively, each valve 13 can be controlled individually. The valves 13 may allow the water volume pumped by the pumping system 10 fully or partially into the sub-systems 4, 5. It is therefore possible to temporarily store a certain volume of water in the conduits before transferring the water into the sub-systems. The valves 13 may be arranged in combination with flow sensors (not shown) to control the flow of water. This is advantageous to perform measurements of temperature, PH, chemical levels, fertilizer levels, etc., of the water by sensing devices 14 arranged in the conduits 9. Additionally or alternatively, a heater or cooler system (not shown) may be installed in the conduits and based on the measurements of water temperature adjust the water temperature to the desired values. This way temperature of the root zone can be efficiently adjusted without exposing the roots to direct contact with hot/cold water pipes which may be damaging to the plant roots.

The system 100 in this example further comprises a plurality of sensing devices 15 within the sub-systems 4, 5. Thus, another degree of control is provided for the system 100 to accurately measure soil/sand/water and root zone parameters and accordingly adjust the pumping system 10 or valves 13. For example, the oxygen level in close proximity of the root zone can be continuously or periodically monitored and in case an undesirable level is detected by the sensing devices 15, a change in the pumping rate or pumping intervals can be applied to adjust the water flow into the sub-systems 4, 5.

In a different example moisture sensors may detect the moisture level of the root zone or various parts of the sub-systems 4, 5 which in turn triggers water inlet into the sub-systems 4, 5.

Returning back to the pumping system 10, a surprising advantage of controlled aerification of root zone is realized by the inventors which is achieved by pumping water back and forth into the sub-systems 4, 5 and in a controlled manner raising and lowering the water level in the sub-systems 4, 5. The action of changing the water level in the sub-systems 4, 5 periodically at regular intervals creates a gas exchange area (see, e.g., FIG. 3) which not only provides the root zone with sufficient and optimal irrigation but also a continuous oxygenation of the roots. It should be noted that the water level in the sub-systems 4, 5 may be raised and lowered between a minimum water level and a maximum water level (see, e.g., FIG. 4) with predetermined values set by the user of the system 100.

Moving on, in FIG. 1B another example of the aerification system 200 is illustrated. In this embodiment, the system 200 further comprises a water/fluid control basin 16 (which may also be referred to as water basin or fluid basin) arranged to be in fluid communication with at least one of the sub-systems 4, 5. In this example the water basin 16 is connected via a conduit 19 to sub-system 4, and sub-system 4 is connected by conduit 9 to sub-system 5. In other words, subs-systems 4, 5 are in direct or indirect fluidic connection with the water basin 16. The water basin 16 is used to permanently or temporarily store water/fertilized water. The water basin 16 in this example is positioned in a separate recess in the subgrade 110 but it should be clear that the skilled person could contemplate positioning the water basin in any suitable location close or remote to the sub-systems 4, 5.

Additionally or alternatively, the water basin may have an opening at an appropriate height level (not shown) in direct contact with one portion of the sub-systems 4, 5 such as the water permeable layer 7 of the sub-systems 4, 5, for example. The connecting conduit 19 can be arranged to connected the water basin 16 to the sub-systems via an opening in the walls 21 of the sub-systems 4, 5 or through an opening/hole in a bottom portion 22 of the subsystems 4, 5 piercing through the water impermeable layer 6 and properly sealed to prevent accidental water leakage.

In this example, the pumping system 10 of water basin 16 pumps water into the sub-system 4 and by means of controllable valves 13 the flow of water to sub-system 5 is adjusted. In a reverse action the pumping system 10 evacuates water from sub-system 5 at predetermined flow rates back to sub-system 4 and/or to the water basin 16. Similar to system 100, in system 200, various parameters of water and sub-systems are measured by deployed sensing devices 14, 15, 18 in the conduit 9, in the sub-systems 4, 5 or in the water basin 16. The water basin 16 in this example additionally comprises an opening with a lid 20 which may be an air-tight lid to seal the fluidic system and also allow access to the water basin 16 from the surface for system maintenance, repairs or rinsing actions, for example.

The water basin 16 may further comprise an injector device (not shown) or via additional pipes, access to reservoirs of fertilizers, nutrients, oxygen, etc., to add these resources directly to the water in the basin 16. The injector device may periodically, or based on the measurement levels of oxygen or fertilizers, be maintained by injecting the desired levels of these elements in water. The water basin 16 may further comprise a heater/cooler system (not shown) similar to the heater/cooler system described for system 100, to adjust the water temperature in the basin 16 and eventually in the root zone. The water basin may further comprise a solar cell assembly (not shown) arranged on the lid 20 to power up equipment such as pumps, sensing devices, etc. in the water basin 16. The water basin 16 may be connected to a pond or natural water sources to receive water.

FIG. 1C illustrates yet another example of the aerification system 300 according to the invention. In the example both sub-systems 4, 5 are arranged to be connected to the water basin 16 via conduits 19. One advantage of this system 300 is that the volume of water transferred between the sub-systems 4, 5 which is to be temporarily stored can be significantly increased by managing the size of the basin, for example the basin 16 may be a 50 L, or preferably a 100 L, more preferably a 500 L or most preferably a 200 L barrel. Therefore, by installing the water basin in close proximity of the sub-systems continuous reliance on external water storage spaces in mitigated.

Further, water circulation capacity of the system 300 is readily increased without the need for excessive piping and relying on many connecting conduits. This in turn makes the maintenance and reparation of the system 300 more cost-efficient. Further, multiple sub-systems can be arranged to be connected to the same water basin 16.

In this example the water is pumped by the pumping system 10 of the water basin 16 in and out of the subsystems 4, 5. For instance, all water capacity of the basin can be pumped into one sub-system, can be divided in certain percentages between the sub-systems or can be fully or partially transferred between the sub-systems via the water basin 16. Similar to the water basin 16 in system 200, the water basin 16 in this example also includes a variety of sensing devices 18, manual or automatic controllable valves 17, heater/cooler devices, and injector devices.

Figure 2:
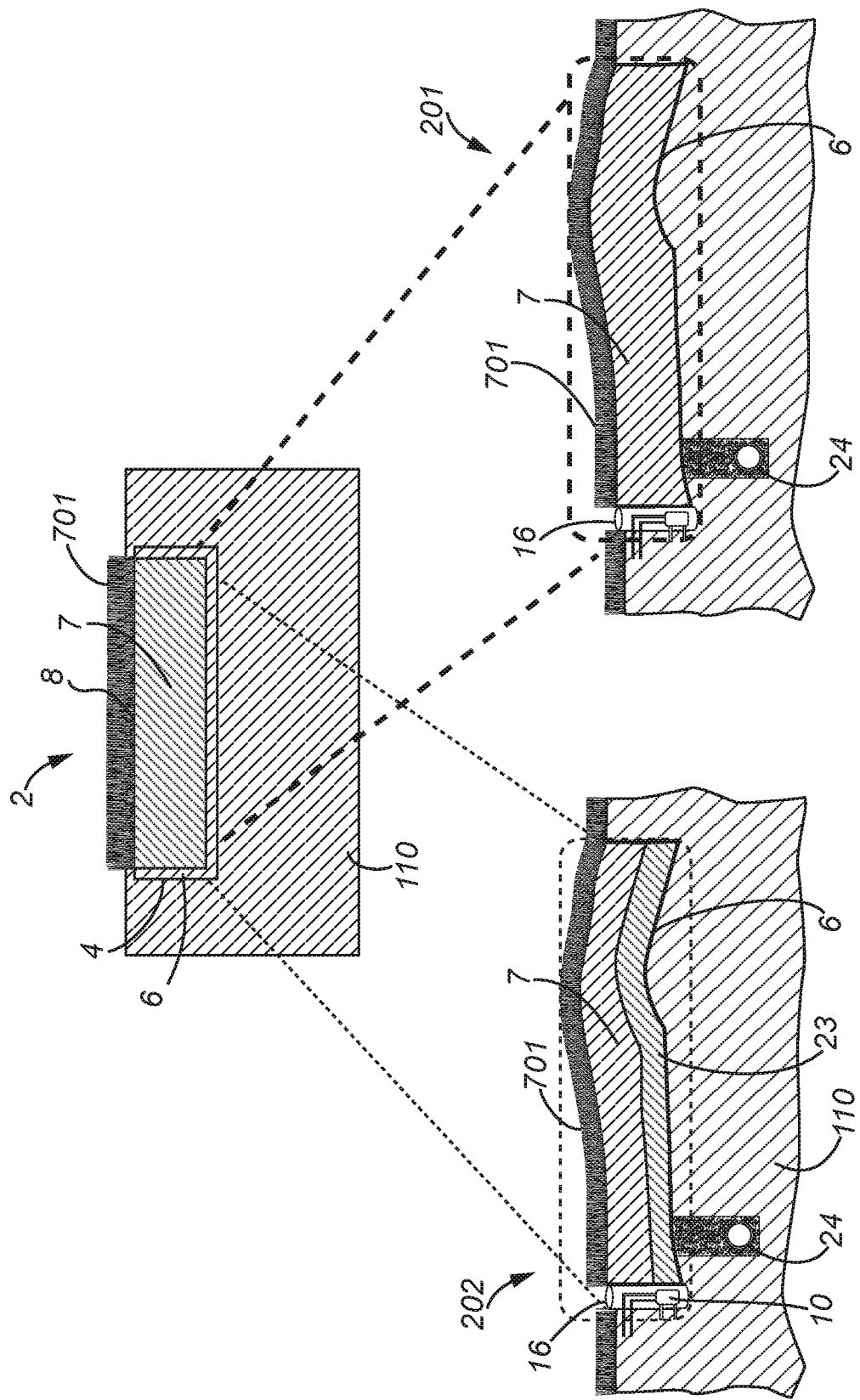
FIG. 2 shows schematic overviews of aerification sub-systems in accordance with at least one embodiment of the present invention.

In FIG. 2 a schematic illustration of an aerification sub-system is provided. In this example similar sub-systems to sub-systems 4 and 5 will be explained in two alternative constructional/structural examples namely sub-system 201 and sub-system 202. In sub-system 201, as explained so far in the description of embodiments there is a substantially water impermeable first layer 6 installed on the subgrade 110 and covering the bottom portion of the recess and the walls of the sub-system 201. A substantially water permeable second layer 7 is installed on top of layer 6. The layer 7 can be sand, soil, combination ratios of sandy soil, any construction aggregate material such as particulate stone, crushed stone, gravel, slag, ceramics, plastics, metal, glass, clay or the like. In this example the roots of the plants are arranged in the second layer 7 below the surface portion 8 of the area 2, 3. Layer 7 allows water to pass through the openings and gaps between the loosely compacted particles of the aggregates and reach the planted roots. The water level in the second layer 7 is raised and lowered by the pumping system pumping water in and out of the area in predetermined intervals.

Each sub-system 201 optionally comprises a drain pipe 24 situated below the water impermeable layer 6 to ensure the subgrade 110 could be drained properly in case of e.g. heavy rainfall or excess amount of ground water accumulation in the subgrade. The subgrade 110 may comprise a plurality of drain pipes 24 distributed anywhere within the subgrade 110. Therefore, any accumulation of water in the surface level could be avoided by draining the excess water through the drain pipes 24 to the water storage spaces or alternatively to the water control basin 16 of the sub-system or to another sub-system directly via a conduit or to a water control basin 16 of another sub-system. This way the water from heavy rainfalls or melted snow can be gathered, introduced to the system and recycled effectively. However, pipe 24 is mainly to drain water from the subsoil below the sub-system in case of and existence of spring water, which is water that moves in soils by capillary action or ground pressure into soils with more pore spaces. However, this is rarely a problem as the system takes care of all rain and water from above.

In yet another example, the sub-systems could comprise more than two layers for example three layers stacked on top of each other as shown in sub-system 202 in FIG. 2. In this example the sub-system 202 comprises a water impermeable first layer 6 installed in the recess and on the compacted subgrade 110. Subsequently, the first layer 6 is overlaid with a porous second layer 23 installed on top of the first layer 6. The porous layer 23 could be for example a mixture comprising cement and particulate stone material such as Capillary Concrete™. Using the mixture of cement and particulate stone material as the porous second layer 23 in the installation of the sub-systems 4, 5 provides a structurally strong construction while offering the unique feature of porosity in the second layer which allows for the water to flow through. Therefore, by controlling the moisture level in the porous second layer 23 the moisture level in the third layer 7 which is directly installed on the second layer 23 can be controlled since water would be transported from the porous second layer 23 to the third layer 7 by means of capillary forces. Additionally, by raising and lowering the water level in the second layer 23 will cause the water level in the third layer to be changed leading to the advantageous aerification of the root zone.

The aerification system 100, 200, 300 according to the invention can be employed in hydroponic growth of large areas of planted surfaces such as sport arenas and golf greens. Plant growing systems have never been used to create a gas exchange zone in the root zone of plant delivering both optimal irrigation and aerification of large areas of planted surfaces such as golf green, lawn, sport arenas, etc. However, it has been realized by the present inventor that the current system can be used in large areas of turf grass it provides new and unexpected advantages and possibilities.

The present inventor has realized that growing turf grass on a large area in materials such as sand or sandy soil with low capability of retaining nutrients (e.g. K+, NH4+, Ca2+), or moisture, also known as materials with low Cation-Exchange Capacity (CEC) and raising and lowering the water level periodically creates a gas exchange zone, and an efficient irrigation and aerification is achieved for a large area of golf green.

Particularly the inventor has realized that the mixture of cement and particulate stone material used as the porous second layer 23 is an inert material with negligible CEC. In addition, the mixture of cement and particulate stone material provides a surprisingly advantageous and financially viable layer to store water, oxygen and will distribute such resources quickly and uniformly underneath the growth bed comprising sand or soil placed on top. In addition, porous second layer 23 will deliver nutritious water to the root zone and promoting controlled and optimal aerification in the root zone.

Further, it is a known problem that over time, organic matter like decaying roots and grass stems under the green's surface become too thick and begin to behave like a sponge, holding water at the surface after rain or irrigation. This inhibits root growth and reduces oxygen levels in the soil which can cause turf decay and even death. By employing the current aerification system, longer lifespan of soil/sand profiles can be achieved due to less accumulation of organic matter on the surface and due to the strength of mixture of cement and particulate stone material such as Capillary Concrete™ as the base material.

Also the current system can be readily installed on almost any subbase with faster establishment of turf. Further, automatic fertigation can be achieved with complete control over water and soil chemistry and nutrient levels delivered to the root zone. Even more, the system oxygenates the root zone regularly, creates a strong root system and accordingly significantly reduces the need for physical aerification solutions such as core aeration by drilling holes in the turf grass which is inconvenient, creates further recurring costs and is undesirable by the golfers.

Figure 3:
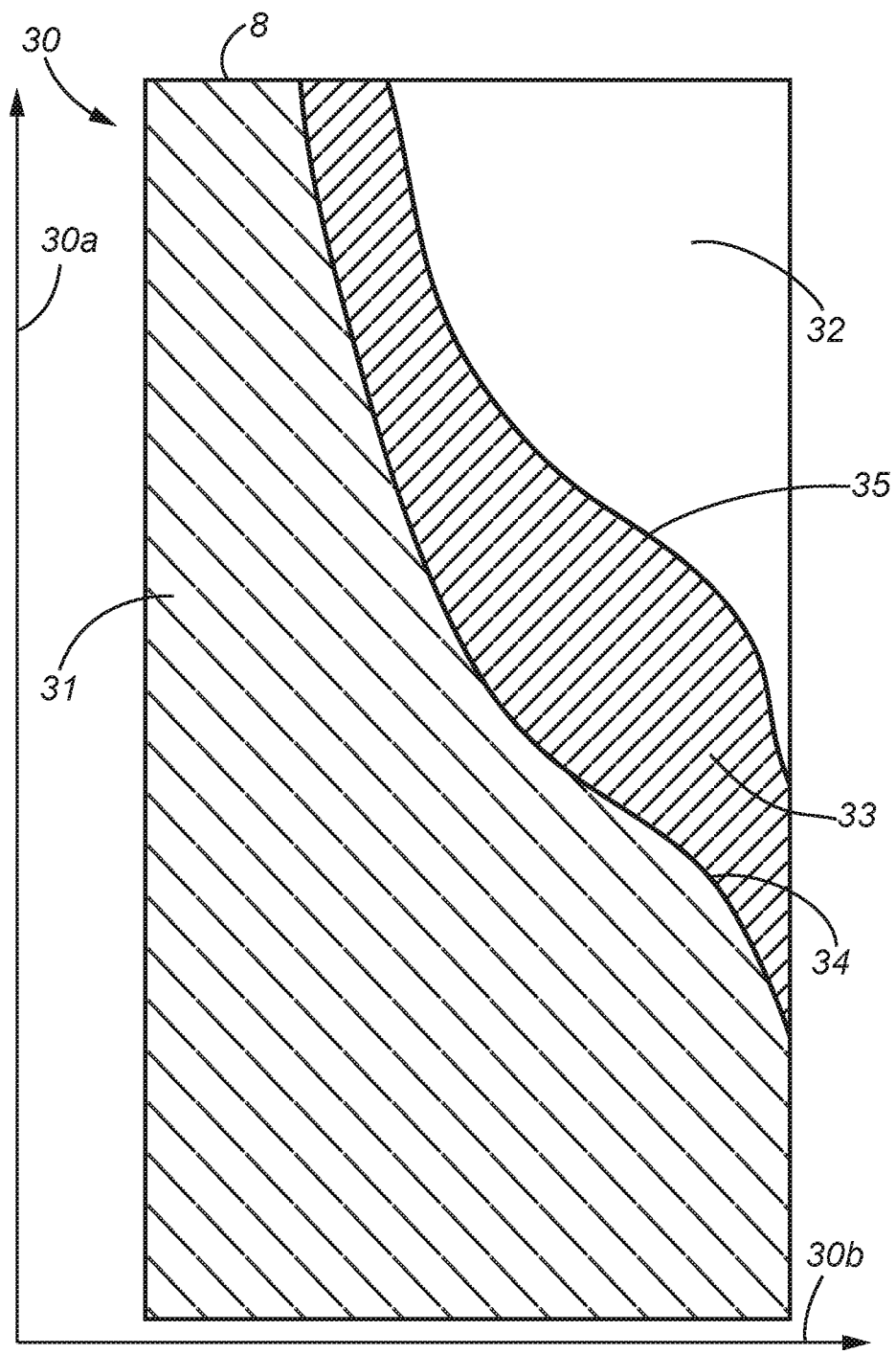
FIG. 3 shows a cross-sectional side view of an area with a surface portion in accordance with one embodiment of the present invention.

FIG. 3 illustrates a cross-sectional partial side view of a portion 30 of the area under the surface 8 where the water level is changed by pumping the water in and out of the portion 30. Portion 30 may be referred to as the soil matrix or as water retention curve. The vertical axis 30a illustrates the tension or the profile depth of the rooting medium e.g. sand or soil and the horizontal axis 30b shows the available pore space or pore volume in rooting medium. Water level 31 can be raised fully up to the surface 8 filling the whole portion 30 or it can be drained completely. In this example the water level 31 is arranged to partially fill the portion 30. The water level 31 may have a minimum level 34 and a maximum level 35.

Thus, by the raising and lowering of the water level occurs between these two height levels and results in creating a gas exchange zone 33. Raising the water level to 35 results in the roots to be efficiently irrigated and by lowering the water level to 34 more air 32 is drawn into the portion 30 from the surface and optimal oxygenation of the roots is achieved.

Figure 4A:
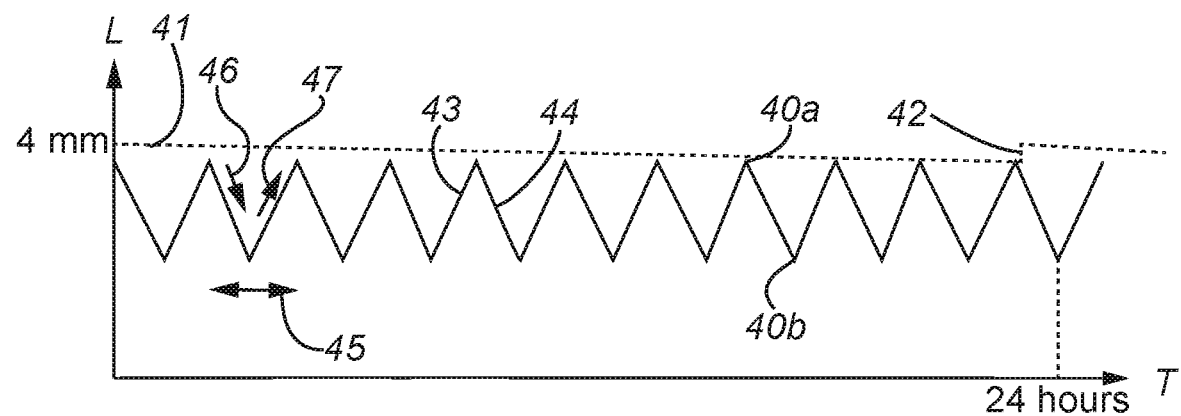
FIGS. 4A and 4B show a diagram of fluid level in accordance with at least one embodiment of the present invention.
Figure 4B:
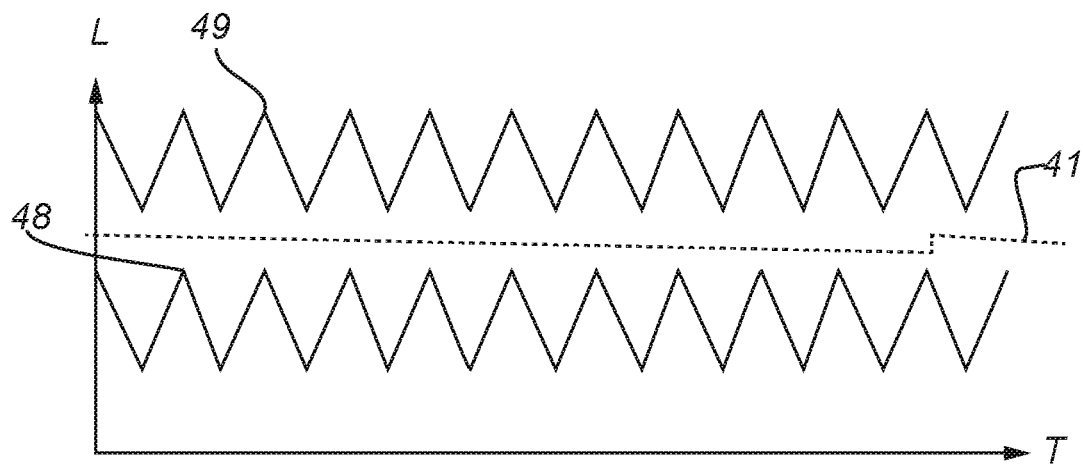

Referring to FIGS. 4A and 4B, a conventional water usage of surface-irrigate turf grass is illustrated in the dashed line 41 in a water height level (L) over time (T) diagram. Turf grass does not typically use more than 4 mm of water per day (24 hours) which is exchanged to air via soil pores due to evapotranspiration. However, as shown in FIG. 4A, due to evapotranspiration the gas exchange capacity 42 of the surface-irrigated surface is rather small and falls short in providing adequate oxygenation of the root zone leading to root decay and probable death. However, the level under the surface can be periodically altered in rising 43 and lowering 44 intervals providing optimal irrigation and oxygenation or gas exchange to the root zone. For example, each cycle of water level changing may drain, i.e., transfer between the sub-systems at least 10 mm, or at least 20 mm or at least 12.5 mm of water in the exchange zone 33 in, e.g., 2-hour intervals 45 facilitating oxygen entry 46 and carbon dioxide exit 47 to and from the root zone.

Additionally or alternatively, the water changing level cycle may transfer at most 10 mm, or at most 12.5 mm or at most 20 mm of water between the sub-systems. The water level is preferably changed between a predetermined maximum height level 40a and a predetermined minimum height level 40b. The predetermined maximum 40a and minimum 40b values may be set by a user of the system or be extrapolated from the gather irrigation data from previous turf grass maintenance plans saved in a database or based on environmental fluctuations such as air humidity and temperature. The predetermined values may be static values or dynamically adjusted during the operation of the system. A cycle of changing water level could be the time period it takes to raise and lower the water level in one sub-system one time or could be the time period for two successive rising 43 and lowering 44 intervals or any other combination of raising and lowering intervals which could readily be configured depending on the intended use.

Further, as seen in FIG. 4B the total volume of water in the sub-system can also be tailored depending on the intended use or weather conditions. For example, a maximum water volume can be increased from a first peak maximum level 48 to a second peak maximum level 49 in case of dry weather conditions and need for increase in overall moisture level in the system. According to the invention by draining, e.g., 12.5 mm of water in each cycle for 20 cycles in a 24-hour time period in equal interval a total amount of 250 mm water can be transferred between the sub-systems continuously irrigating the root zone without exchange to the pores by evapotranspiration as in conventional surface-irrigated systems.

Figure 5A:
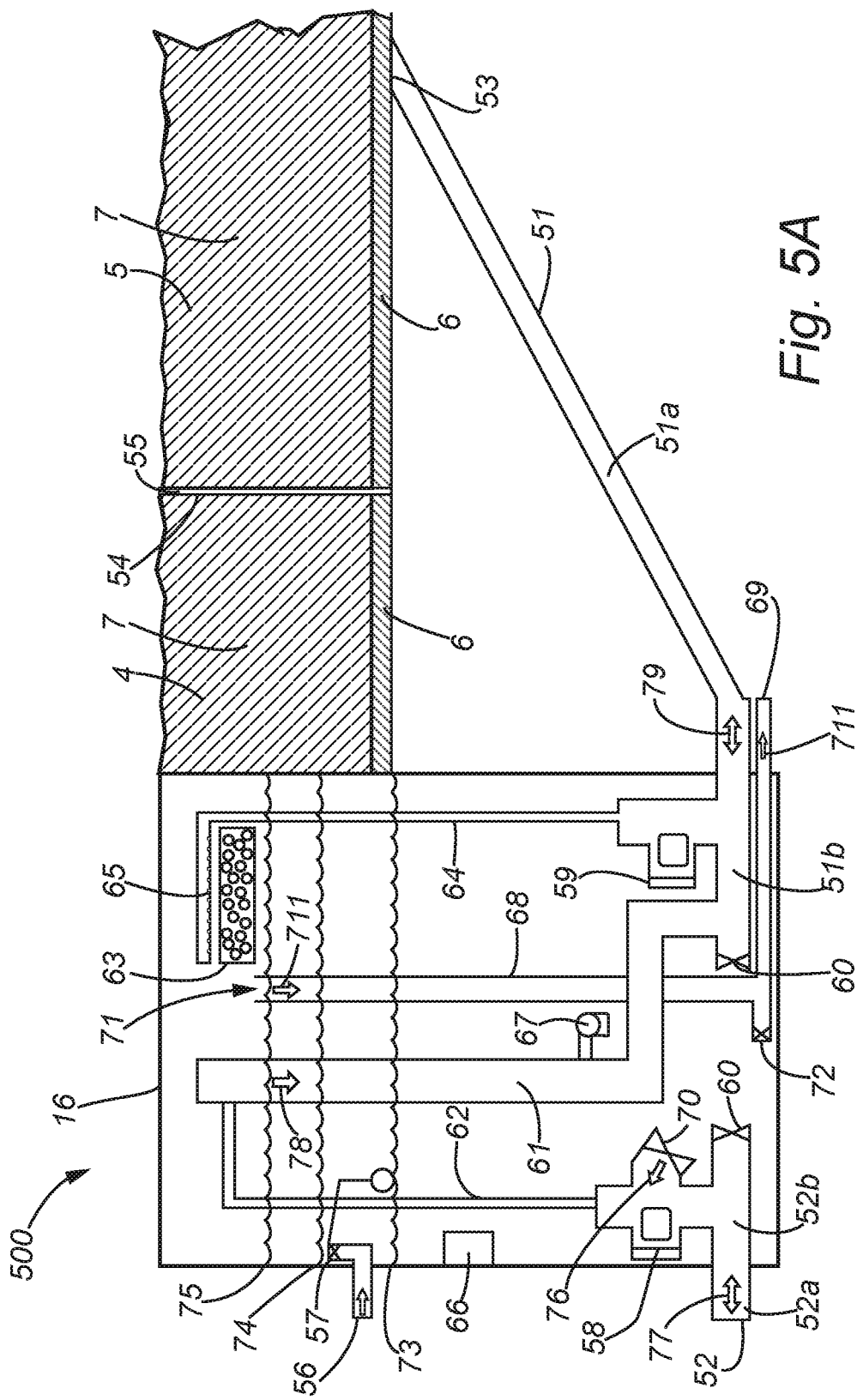
FIGS. 5A, 5B and 5C show a cross-sectional partial view of an aerification system in accordance with at least one embodiment of the present invention.

In FIG. 5A another example of the aerification system 500 according to the invention is illustrated. A partial overview of the sub-systems 4, 5 connected to each other through conduits 51 and 52 via a water control basin 16 is shown. In this example the maximum surface area is 64 m², however the system can be adjusted for various sizes and areas. In this example the rooting medium 7, has a 5-10% Volumetric Water Content at 20-30 cm (3 kPa) tension, is made of sand with a particle size of 0.1-2.0 mm, Saturated Hydraulic Conductivity of minimum 200 mm/h, without any organic material or amendments, and pore volume of 35-55%.

In this example conduit 51 is connected to sub-system 5 via a bottom portion 53 of the water impermeable layer 6. A through hole or opening (not shown) in the bottom portion 53 can be arranged to receive the conduit 51 and be sealed properly to prevent leakage in the connection port. The conduit 51 may have a diameter of 50 mm. Conduit 52 may be similar to conduit 51 in dimensions and is connected to sub-system 4 via the same arrangement (not shown) described for conduit 51.

Additionally or alternatively more than one conduit e.g. a plurality of conduits may be connected to sub-systems 4 and 5 via the bottom portions, or the walls of the sub-systems. The conduits 51 and 52 are also connected to the water basin 16. Even though in this example the connection of the conduits is illustrated in the bottom portion of the water basin 16, conduits having rectangular cross-sections and conduit 51 creating a triangular space between the sub-systems 4, 5 and the water basin 16, it should be appreciated that conduits may be connected to the water basin at any other portion, appropriate height and with any other geometrical shapes and layouts suitable for the piping system. The two sub-systems 4, 5 are separated in the tee area 54, for example, by a water impermeable liner 55 such as a plastic or rubber layer preventing water to pass through the vertical walls between the sub-systems 4, 5. The sub-system 4, 5 may be optionally provided with waffle-drain layers (not shown) arranged on top of the water impermeable layer 6 to direct water easily from the center of the areas to the outer perimeters of the areas.

The sub-systems 4, 5 may have the same footprint (i.e. equally large) or occupy different area sizes. In this example, sub-systems 4, 5 are two sections of the same area divided into two equally large sections in the tee area. In this example the water basin 16 is filled with water via an inlet 56 and a water fill valve 57 connected to an external pumping system (not shown) or a water storage space. In this example, the aerification system 500 further comprises two air lift pumping systems 58, 59 arranged inside the water basin 16. The advantage of installing air lift pumps 58, 59 in the water basin 16 is that this way there is no mechanical part include in the pumping of water between the sub-systems 4, 5 and therefore a cost-effective and reliable pumping system is utilized without requiring extensive reparation and maintenance. Another advantage is that the air lift pumps provide excellent oxygenation of the water, increasing the dissolved oxygen levels of the water circulated in the system. The air lift pumps may have 640 Liter/h minimum capacity and is run by an air pump which may have 30-100 Watt output power.

The conduits 51 and 52 in this example have an external portion 51*a*, 52*a* located outside the water basin 16 e.g. installed in the compacted subgrade 110. The internal portions 51*b*, 52*b* of the conduits 51, 52 in this example are located inside the water basin 16 and are provided with the air lift pumps 58, 59 and controllable valves 60. The valves 60 may be manual or automatically powered valves. The internal portions 51*b*, 52*b* are connected via a shared conduit 61 which may be in turn connected to other pipes such as a riser pipe 62. Either or both of internal portions 51*b*, 52*b* may be connected to a bio-filter 63 such as a *Trichoderma* bio-filter 63 in this example.

In this example the internal portion 51*b* is connected to a riser pipe 64 via the air lift pump 59. The riser pipe 64 is provided with openings 65 which expose the pumped water to the bio-filter 63 and filter out microbial pathogens or organic contaminants from circulating water. The air lift pumps 58, 59 mix water with air bubbles and cause the bubble-mixed water to rise in the pipes e.g. in the riser pipes 62, 64 due to reduced density compared to the higher layers of unmixed water in the pipes. Therefore, a simple water circulation system is achieved which can transfer water from sub-system 4 to sub-system 5 via the water control basin 16. Further, a highly oxygenated water mixture is provided for the root zone.

The water level in the water basin could be in continuous change based on the consumption of the system 500. The water basin 16 is further provided with sensing devices 66 to measure the water level, temperature, PH, chemical levels, oxygen levels, etc., for instance. The water level may be at a low value 73, passive value 74 when the pumps 58, 59 are turned off or high value 75 in case of excess water in the system 500. If the water level is detected to be low 73, fresh water from a water storage space or other sub-systems may be introduced to the water basin 16 through the inlet 56. When the water level is in the passive level 74 and air valve 67 may be used to balance the amount of water in sub-systems 4 and 5. At high water levels 75, the water basin 16 may be drained via a drain conduit 68 having an inlet 71 in fluidic communication with the water in the water basin 16 and simply drain the excess levels of water by a vacuum pump (not shown) or gravity in the direction shown by arrow 711 through an excess water exit outlet 69.

The water exit outlet 69 may be controlled by valves. The water exit outlet may be used to completely drain the basin 16 for rinsing or maintenance purposes through a flush valve 72. The valves in the conduits and in the basin may be two-way valves 57, 60, 72 or one-way valves 70. In this example the one-way valve 70 allows water entry in the direction of arrow 76 from the basin to the pump 58, the internal portion 52*b*, and the external portion 52*a* to provide water for sub-system 4. Water from sub-system 4 can be transferred in and out of the basin as shown by arrow 77.

The air lift pump 58 then pumps up the water from sub-system 4 via pipe 62 and shared pipe 61 shown by arrow 78 and internal portion of conduit 51*b* to sub-system 5. The water from sub-system 5 can also be transferred in and out of the water basin 16 as shown by arrow 79. Accordingly, the water level in sub-systems 4 and 5 can be raised and sunk to promote oxygenation of the root zone below the surface. It should be noted that the geometry and size of the pipes or conduits or the water basin is not a critical factor in proper operation of the aerification system 500 and can be adjusted for the intended use. For instance, the pipes may have a diameter of 2, 4, 8, 14, 15, 18 inches or similar.

Figure 5B:
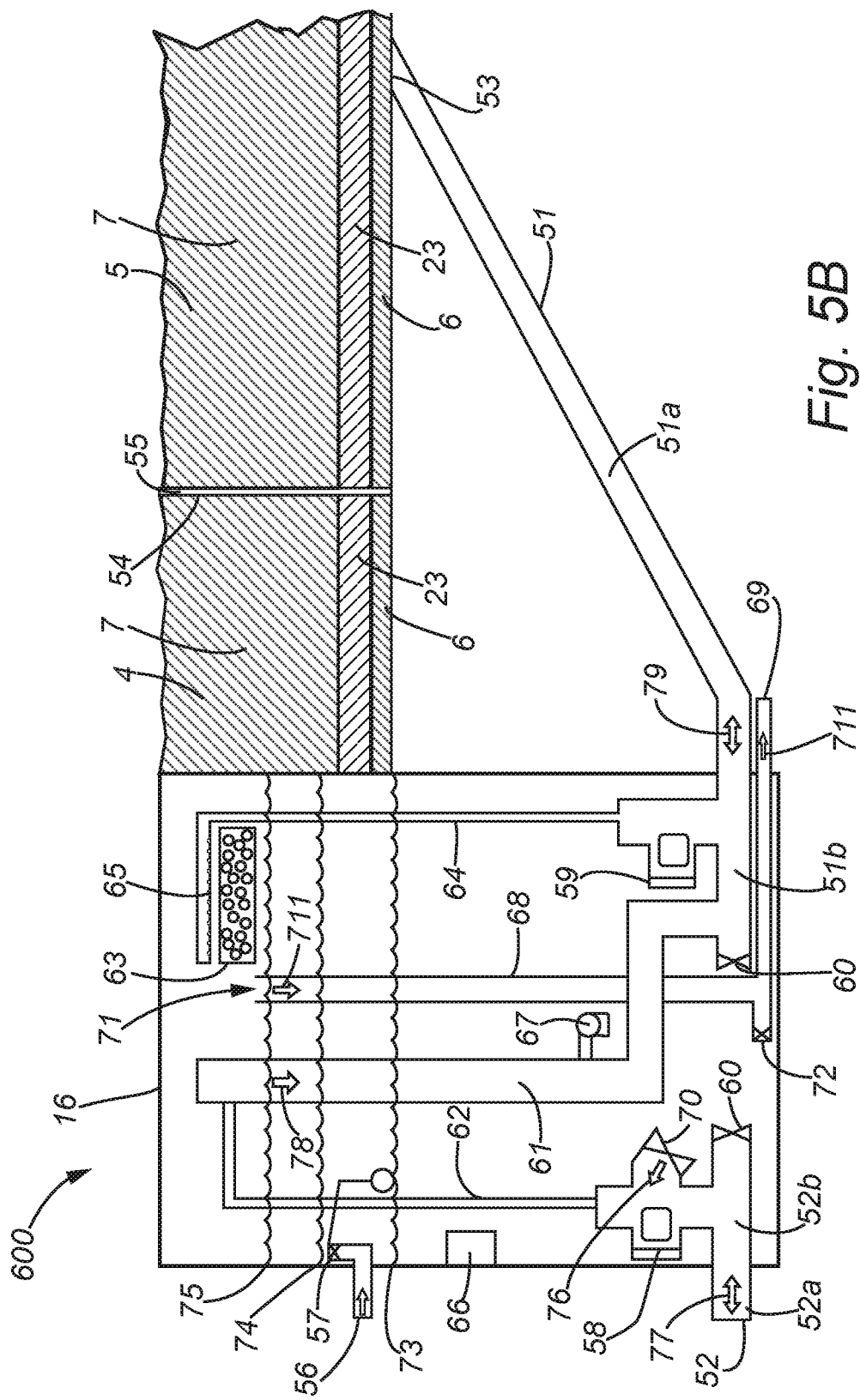

FIG. 5B illustrates yet another example of the aerification system 600 according to the invention. In the system 600 the sub-systems are provided with the additional porous second layer 23 such as Capillary Concrete™ described above. The irrigation and aerification advantages described in FIG. 5A for system 500 by adjusting the water level and raise and lower intervals by means of air lift pumps 58 and 59 are also similarly achieved in the system 600. In this example the rooting medium 7 is arranged on top of the porous second layer 23. The porous second layer 23 may be a ready-mix layer (e.g. Capillary Concrete™) with the thickness of 5 cm, and designed to have a minimum hydraulic conductivity K=10000 mm/h, with total void pore volume more than 20%. In this and other examples the water impervious layer may be a 1 mm-thick EPDM Pond liner, also covering side walls to the surface and sub-systems. Optional waffle plastic structure drain tiles (not shown), 150 mm wide, and 30 mm high may be connected to the 50 mm pipe 51, 52.

In this example the sub-systems can withstand machinery for maintenance equivalent to triplex mower with minimum 650 kg weight and have the ability to handle more than 200 golfers per day. Minimum drainage 30 mm per 24 hours in the finished profile with grass established can be achieved and the system has the ability to drain 10 mm in 30 min from field capacity as well as supply water from below at 30 cm depth of min 10 mm/h.

Figure 5C:
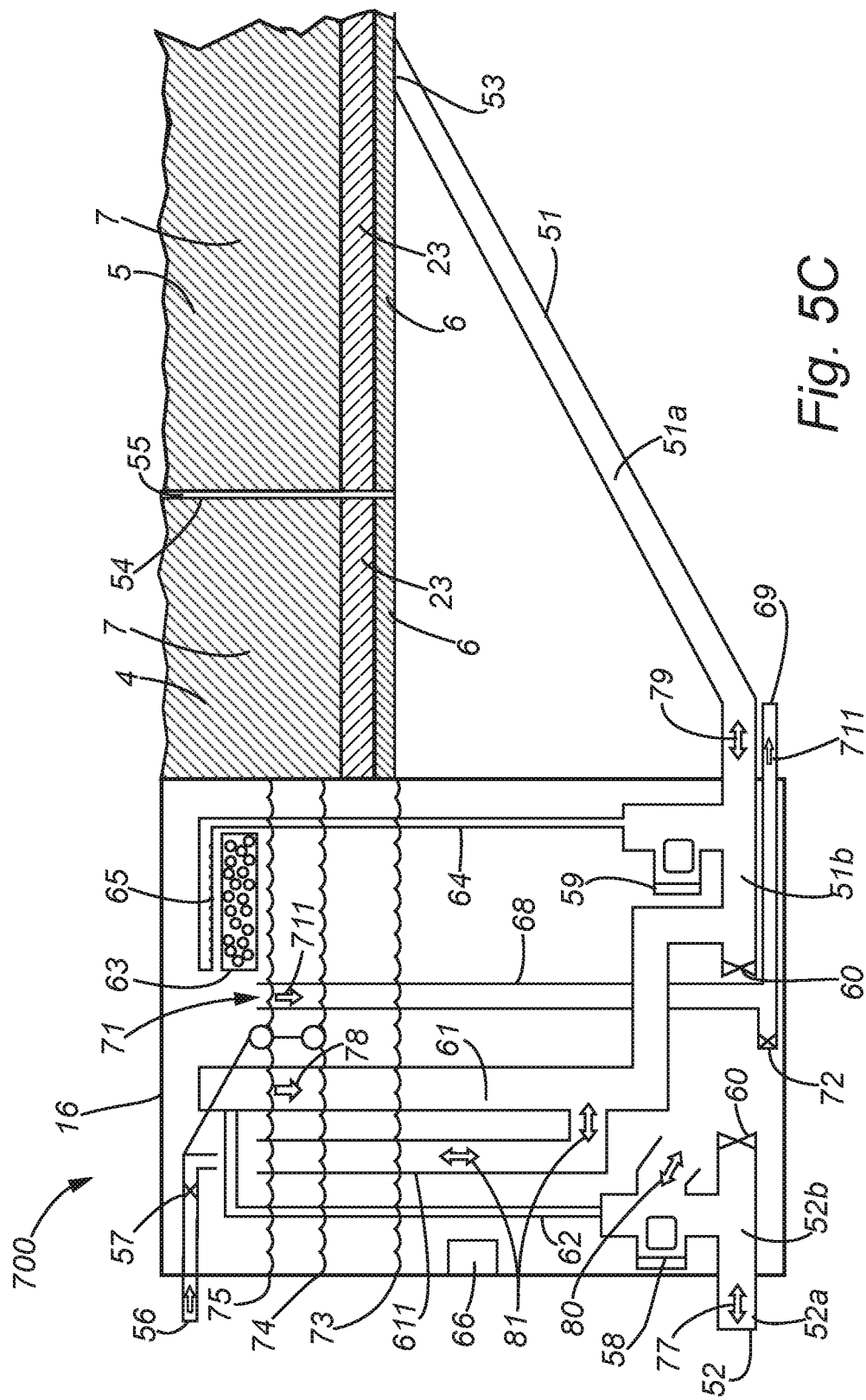

FIG. 5C illustrates yet another example of the aerification system 700, according to the invention. This example is different from the systems 500 and 600 in FIGS. 5A-B, in that the air valve 67 has been removed and another riser pipe 611 is added to be in fluid communication with conduit 61. Further the inlet 56 and the water fill valve 57 has been directed to the riser pipe 611 which renders the air valve 67 unnecessary and improves the reliability of the system. Also the one-way back-flow valve 70 has been removed in this example and replaced by an opening allowing water to flow in both directions 80.

This example is particularly advantageous in order to make sure that the system 700 fills both sub-systems 4, 5 in case of a power failure or air pump failure of some kind. By arranging the water supply inlet 56 and fill valve 57 directed to the sub-system 5, via the new raiser pipe 611 (see arrows 81), this sub-system 5 can be filled first, subsequently when that pipe 611 overflows, it fills the basin 16. The riser pipe 611 is arranged slightly lower than when the fill valve 57 shuts off, and lower than the overflow drainage pipe 71.

By removing the back flow valve 70 the function that the sub-system 4 cannot have more water than the basin 16 can be achieved. This is to ensure that if in an occasion the pumps 58, 59 stop just after filling sub-system 4 and then a heavy rain arrives, the sub-system 4 does not overflow and the water is transferred back to the basin 16, a precaution leading to removal of valve 70 in this example. In this case, the sub-system 4 would not have higher water table than the overflow valve 72, same as sub-system 5.

FIG. 6 illustrates a flow chart describing a method for providing an aerification system in accordance with an aspect of the present invention. At step 101 at least first and second aerification sub-systems 4, 5 being in fluidic communication with one or more areas to be aerified, are provided. In the next step 103, at least one conduit 9 arranged to fluidically connect the first sub-system 4 to the second sub-system 5, is provided. A pumping system 10 for pumping a fluid back and forth between the first sub-system 4 and the second sub-system 5 is provided in step 105. In step 107, the fluid from the first sub-system 4 by the pumping system 10 via the at least one conduit 9 is at least partly transferred to the second sub-system 5. In step 109, the fluid from the second sub-system 5 by the pumping system 10 via the at least one conduit 9 is at least partly transferred to the first sub-system 4. In step 111 raising and lowering a height level of the fluid in the first and second sub-systems 4, 5 and consequently enabling a gas exchange below the surface portion 8 is performed. The transfer of fluid or water between the sub-system 4 and sub-system 5 is iterated periodically and in certain intervals in steps 112 and 113 ensuring continuous circulation of water between the sub-systems and change of water level accordingly.

The invention has now been described with reference to specific embodiments. However, several variations of the aerification system are feasible. For example, several aerification systems according to the invention may be installed over a large area, connected through a network of conduits and where all of them are controlled and monitored from the same location. Further, the aerification system may be fully automatic based on input from sensing devices or it may be fully manual, e.g., the water may be added and removed manually to/from the water control basin, or there may be no flow control on the transferred water thus eliminating the need to install controllable valves and realize even more cost-effective systems depending on the particular situation and needs.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

That which is claimed is:

1. An aerification system for controlling a moisture content and gas exchange below a surface portion of one or more areas to be irrigated, said system comprising:
   at least first and second aerification sub-systems being in fluidic communication with said one or more areas, and being installable in a recess above which said surface portion is located;
   at least one conduit arranged to fluidically connect said first sub-system to said second sub-system; and
   at least one pumping system for pumping a fluid back and forth between said first sub-system and said second sub-system;
   wherein said fluid from said first sub-system is at least partly transferable by said pumping system via said at least one conduit to said second sub-system and wherein said fluid from said second sub-system is at least partly transferable by said pumping system via said at least one conduit to said first sub-system and wherein said pumping system is further configured to periodically raise and lower a height level of said fluid between a predetermined minimum height level value and a predetermined maximum height level value in the first and second sub-systems enabling a gas exchange below said surface portion.

2. The aerification system according to claim 1, wherein said pumping system is further configured to raise and lower the height level of said fluid between said predetermined minimum height level value and said predetermined maximum height level value in the first and second sub-systems in predetermined time intervals.

3. The aerification system according to claim 1, wherein when the height level of said fluid is raised in said first sub-system, the height level of said fluid is lowered in the second sub-system.

4. The aerification system according to claim 1, wherein when the height level of said fluid is raised in said second sub-system, the height level of said fluid is lowered in the first sub-system.

5. The aerification system according to claim 1, wherein said system further comprises one or more sensing devices configured to measure a plurality of parameters of said fluid.

6. The aerification system according to claim 1, wherein said system further comprises one or more controllable valves arranged to control a flow of said fluid in said system.

7. The aerification system according to claim 1, wherein said at least one pumping system is arranged in said at least one conduit.

8. The aerification system according to claim 5, wherein said one or more sensing devices are arranged in said at least one conduit and configured to measure said plurality of parameters of said fluid.

9. The aerification system according to claim 6, wherein said one or more controllable valves are arranged in said at least one conduit and are configured to control a flow of said fluid along said at least one conduit.

10. The aerification system according to claim 1, wherein each sub-system comprises:
    a substantially fluid impermeable first layer for preventing fluid from escaping a volume defined by said recess; and
    a substantially fluid permeable second layer arranged on top the first layer.

11. The aerification system according to claim 10, wherein at least one portion of said second layer is in fluidic communication with said at least one conduit.

12. The aerification system according to claim 10, wherein each sub-system further comprises:
    a fluid control basin comprising means for controlling a moisture level of said second layer.

13. The aerification system according to claim 12, wherein at least one portion of said second layer is in fluidic communication with said fluid in the fluid control basin.

14. The aerification system according to claim 1, wherein each sub-system comprises:
    a substantially fluid impermeable first layer for preventing fluid from escaping a volume defined by said recess;

a porous second layer arranged on top of the first layer;
a third layer of rooting medium arranged on top of the second layer;
such that a fluid from said porous second layer is enabled to be transported towards said third layer of rooting medium by means of capillary forces.

15. The aerification system according to claim 14, wherein each sub-system further comprises:
a fluid control basin comprising means for controlling a moisture level of said second layer.

16. The aerification system according to claim 10, wherein said second layer is at least partly made of one of gravel or sand.

17. The aerification system according to claim 14, wherein said second layer is a mixture comprising cement and particulate material.

18. The aerification system according to claim 12, wherein said at least one pumping system is arranged in said fluid control basin and is configured to pump said fluid in and out of said fluid control basin.

19. The aerification system according to claim 15, wherein said fluid control basin further comprises an injection device configured to inject gases or plant growth promoter fluids in said fluid control basin.

20. The aerification system according to claim 19, wherein said system further comprises one or more sensing devices, and said one or more sensing devices are arranged in said fluid control basin and are configured to measure a plurality of parameters of said fluid in said fluid control basin.

21. The aerification system according to claim 1, wherein at least one sub-system is in fluidic communication with a fluid storage space.

22. The aerification system according to claim 1, wherein said aerification system further comprises a controller configured to control said at least one pumping system for transferring said fluid back and forth between said first and said second sub-systems.

23. The aerification system according to claim 5, wherein said system further comprises a controller configured to control said one or more sensing devices for continuously measuring said plurality of parameters of said fluid in a time series.

24. The aerification system according to claim 6, wherein said system further comprises a controller configured to control said one or more controllable valves for adjusting the flow of said fluid between said first and said second sub-systems.

25. The aerification system according to claim 1, wherein a bottom portion of said first sub-system is located at a vertically higher level than a bottom portion of said second sub-system such that said fluid is transferable, at least partly, from said first sub-system to said second sub-system by means of gravity.

26. The aerification system according to claim 5, wherein said plurality parameters are at least one of temperature, PH, fertilizer level and oxygen level of said fluid.

27. The aerification system according to claim 26, wherein said system further comprises a controller configured to control said at least one pumping system based on a comparison of the measurements of the sensing devices with a predetermined value for each of said plurality of parameters.

28. The aerification system according to claim 27, wherein said controller is further configured to control said at least one pumping system based on a data stream received from a weather forecast center.

29. The aerification system according to claim 5, wherein said one or more sensing devices are further configured to measure a plurality of parameters of said sub-systems.

30. A method for providing an aerification system for controlling a moisture content below a surface portion of one or more areas to be irrigated said method comprising:
providing at least first and second aerification sub-systems being in fluidic communication with said one or more areas, and being installable in a recess above which said surface portion is located;
providing at least one conduit arranged to fluidically connect said first sub-system to said second sub-system;
providing at least one pumping system for pumping a fluid back and forth between said first sub-system and said second sub-system;
transferring at least partly said fluid from said first sub-system by said pumping system via said at least one conduit to said second sub-system;
transferring at least partly said fluid from said second sub-system by said pumping system via said at least one conduit to said first sub-system;
periodically raising and lowering a height level of said fluid between a predetermined minimum height level value and a predetermined maximum height level value in the first and second sub-systems and enabling a gas exchange below said surface portion.

31. The method according to claim 30, wherein the method further comprises raising and lowering the height level of said fluid between said predetermined minimum height level value and said predetermined maximum height level value in the first and second sub-systems in predetermined time intervals.

32. The method according to claim 30, wherein the method further comprises, when raising the height level of said fluid in said first sub-system, lowering the height level of said fluid in the second sub-system.

33. The method according to claim 30, wherein the method further comprises, when raising the height level of said fluid in said second sub-system, lowering the height level of said fluid in the first sub-system.

34. The method according to claim 30, wherein the method further comprises transferring, at least partly, said fluid from said first sub-system to said second sub-system by adding said fluid to a second layer of said second sub-system.

35. The method according to claim 34, wherein the method further comprises transferring at least partly, said fluid from said first sub-system to said second sub-system by adding said fluid to a fluid control basin of said second sub-system.

* * * * *